(12) United States Patent
Edwards et al.

(10) Patent No.: US 11,172,423 B2
(45) Date of Patent: Nov. 9, 2021

(54) SOLAR-POWERED ACCESS POINT FOR LOAD BALANCING NETWORK TRAFFIC ACROSS BACKHAUL NETWORKS

(71) Applicant: ITRON, INC., Liberty Lake, WA (US)

(72) Inventors: Bruce Edwards, San Jose, CA (US); Kunal Shah, Mountain View, CA (US)

(73) Assignee: ITRON, INC., Liberty Lake, WA (US)

( * ) Notice: Subject to any disclaimer, the term of this patent is extended or adjusted under 35 U.S.C. 154(b) by 0 days.

(21) Appl. No.: 16/237,562

(22) Filed: Dec. 31, 2018

(65) Prior Publication Data
US 2020/0213929 A1 Jul. 2, 2020

(51) Int. Cl.
| | | |
|---|---|---|
| *H04L 12/26* | (2006.01) | |
| *H04W 40/00* | (2009.01) | |
| *H04W 40/10* | (2009.01) | |
| *H04W 40/12* | (2009.01) | |
| *H02J 7/35* | (2006.01) | |
| *H04W 28/02* | (2009.01) | |
| *H04L 12/10* | (2006.01) | |
| *H04W 88/08* | (2009.01) | |
| *H04B 17/318* | (2015.01) | |

(Continued)

(52) U.S. Cl.
CPC ........... *H04W 40/005* (2013.01); *H02J 3/383* (2013.01); *H02J 7/35* (2013.01); *H04B 17/318* (2015.01); *H04B 17/336* (2015.01); *H04L 12/10* (2013.01); *H04W 28/0268* (2013.01); *H04W 40/10* (2013.01); *H04W 40/12* (2013.01); *H04W 88/08* (2013.01)

(58) Field of Classification Search
None
See application file for complete search history.

(56) References Cited

U.S. PATENT DOCUMENTS

| | | |
|---|---|---|
| 4,476,853 A | 10/1984 | Arbogast |
| 4,494,854 A | 1/1985 | Yamaga et al. |
| 4,667,142 A | 5/1987 | Butler |

(Continued)

FOREIGN PATENT DOCUMENTS

| | | |
|---|---|---|
| CN | 103139936 A | 6/2013 |
| CN | 103338532 A | 10/2013 |

(Continued)

OTHER PUBLICATIONS

International Search Report for application No. PCT/US2019/068073 dated Mar. 9, 2020.

(Continued)

*Primary Examiner* — Zewdu A Beyen
(74) *Attorney, Agent, or Firm* — Artegis Law Group, LLP

(57) ABSTRACT

A solar-powered device (SPD) node operates as an access point for leaf nodes. The SPD node load balances network traffic received from leaf nodes across different backhaul networks. The SPD node determines a specific backhaul network across which to route the network traffic based on several different factors associated with the SPD node. Those factors include a current battery level, a current solar generation rate, and a current communication link status. The SPD access point also determines the specific backhaul network across which to route the network traffic based on characteristics of the different backhaul networks, including a network latency, among other characteristics.

21 Claims, 10 Drawing Sheets

(51) Int. Cl.
*H04B 17/336* (2015.01)
*H02J 3/38* (2006.01)

(56) References Cited

U.S. PATENT DOCUMENTS

| | | | |
|---|---|---|---|
| 5,387,858 A | 2/1995 | Bender et al. |
| 5,411,537 A | 5/1995 | Munshi et al. |
| 5,920,827 A | 7/1999 | Baer et al. |
| 5,998,052 A | 12/1999 | Yamin |
| 6,127,797 A | 10/2000 | Walker |
| 6,204,636 B1 | 3/2001 | Kinoshita et al. |
| 6,763,237 B1 | 7/2004 | Katz |
| 6,813,897 B1 | 11/2004 | Bash et al. |
| 7,038,333 B2 | 5/2006 | Bourilkov et al. |
| 7,345,371 B1 | 3/2008 | Kuelbs |
| 7,518,253 B2 | 4/2009 | Kuelbs |
| 7,615,962 B1 | 11/2009 | Kuelbs |
| 7,688,222 B2 | 3/2010 | Peddie et al. |
| 7,688,778 B2 | 3/2010 | Ogushi |
| 7,760,109 B2 | 7/2010 | Broad et al. |
| 7,772,798 B2 | 8/2010 | Rodas et al. |
| 7,825,615 B2 | 11/2010 | Chen et al. |
| 7,830,110 B1 | 11/2010 | Kuelbs |
| 7,859,431 B2 | 12/2010 | Peddie et al. |
| 8,035,337 B1 | 10/2011 | Oakenfull |
| 8,129,850 B2 | 3/2012 | Kuelbs et al. |
| 8,149,717 B2 | 4/2012 | Gossain et al. |
| 8,188,878 B2 | 5/2012 | Pederson et al. |
| 8,390,244 B2 | 3/2013 | Wooley et al. |
| 8,421,252 B1 | 4/2013 | Kuelbs et al. |
| 8,421,401 B2 | 4/2013 | Wen |
| 8,422,256 B2 | 4/2013 | Giuntini et al. |
| 8,525,441 B2 | 9/2013 | Shuy et al. |
| 8,588,830 B2 | 11/2013 | Myer et al. |
| 8,618,934 B2 | 12/2013 | Belov et al. |
| 8,707,075 B2 | 4/2014 | Broad et al. |
| 8,716,889 B2 | 5/2014 | Vaidyanathan |
| 8,787,392 B2 | 7/2014 | Vasseur et al. |
| 8,803,362 B2 | 8/2014 | Schmiegel |
| 8,811,234 B2 | 8/2014 | Gossain et al. |
| 8,896,151 B2 | 11/2014 | Yamane et al. |
| 8,901,411 B2 | 12/2014 | Liu et al. |
| 8,902,076 B2 | 12/2014 | Pederson et al. |
| 8,929,228 B2 | 1/2015 | Budampati et al. |
| 8,941,252 B1 | 1/2015 | Kuelbs et al. |
| 8,970,394 B2 | 3/2015 | Veillette |
| 9,019,122 B2 | 4/2015 | Heller |
| 9,086,686 B2 | 7/2015 | Kojima et al. |
| 9,087,338 B2 | 7/2015 | Levine et al. |
| 9,090,253 B2 | 7/2015 | Flath et al. |
| 9,103,567 B2 | 8/2015 | Dwyer et al. |
| 9,167,516 B2 | 10/2015 | Arendas |
| 9,236,751 B2 | 1/2016 | Goei et al. |
| 9,300,581 B1 | 3/2016 | Hui et al. |
| 9,344,365 B1 | 5/2016 | Hui et al. |
| 9,369,374 B1 | 6/2016 | Hui et al. |
| 9,385,953 B1 | 7/2016 | Hui et al. |
| 9,413,457 B2 | 8/2016 | Pederson et al. |
| 9,465,078 B2 | 10/2016 | Betzner |
| 9,568,522 B2 | 2/2017 | Aiello et al. |
| 9,581,972 B1 | 2/2017 | Arrow et al. |
| 9,621,462 B2 | 4/2017 | Hui et al. |
| 9,655,207 B2 | 5/2017 | Monaci et al. |
| 9,780,567 B2 | 10/2017 | Hunt et al. |
| 9,788,400 B2 | 10/2017 | Flinsenberg et al. |
| 9,839,088 B1 | 12/2017 | Deaton |
| 9,843,286 B2 | 12/2017 | Sills et al. |
| 9,847,944 B2 | 12/2017 | Chow et al. |
| 9,889,915 B2 | 2/2018 | Zhang et al. |
| 9,893,985 B2 | 2/2018 | Hui et al. |
| 10,006,666 B2 | 6/2018 | Tamaura |
| 10,209,283 B2 | 2/2019 | Aiello et al. |
| 10,313,967 B2 | 6/2019 | Chandra et al. |
| 10,359,797 B2 | 7/2019 | Carlson |
| 10,455,395 B2 | 10/2019 | Gharabegian |
| 10,514,140 B2 | 12/2019 | Sreshta et al. |
| 10,539,964 B2 | 1/2020 | Minorics |
| 10,567,280 B2 | 2/2020 | Hui et al. |
| 10,594,145 B1 | 3/2020 | Wang et al. |
| 10,608,962 B2 | 3/2020 | Edwards |
| 10,612,738 B1 | 4/2020 | Sreshta et al. |
| 10,647,449 B2 | 5/2020 | Wasson et al. |
| 10,687,228 B2 | 6/2020 | Gardner |
| 10,718,500 B1 | 7/2020 | Tylicki et al. |
| 10,727,682 B2 | 7/2020 | Park et al. |
| 10,785,719 B2 | 9/2020 | Chandra et al. |
| 2003/0155887 A1 | 8/2003 | Bourilkov et al. |
| 2005/0257827 A1 | 11/2005 | Gaudiana et al. |
| 2005/0270175 A1 | 12/2005 | Peddie et al. |
| 2006/0002368 A1 | 1/2006 | Budampati et al. |
| 2006/0039316 A1* | 2/2006 | Ogushi ............... H04W 8/26 370/328 |
| 2006/0187656 A1 | 8/2006 | Kuelbs et al. |
| 2006/0204795 A1 | 9/2006 | Schulman |
| 2006/0220843 A1 | 10/2006 | Broad et al. |
| 2008/0001735 A1 | 1/2008 | Tran |
| 2008/0191491 A1 | 8/2008 | Kuelbs |
| 2008/0243079 A1 | 10/2008 | Wooley et al. |
| 2008/0246339 A1 | 10/2008 | Rodas et al. |
| 2008/0310850 A1 | 12/2008 | Pederson et al. |
| 2009/0029645 A1 | 1/2009 | Leroudier |
| 2009/0096399 A1 | 4/2009 | Chen et al. |
| 2009/0173375 A1 | 7/2009 | Frazier et al. |
| 2009/0236911 A1 | 9/2009 | Carroll |
| 2009/0256723 A1 | 10/2009 | Peddie et al. |
| 2010/0029268 A1 | 2/2010 | Myer et al. |
| 2010/0057267 A1 | 3/2010 | Liu et al. |
| 2010/0060231 A1 | 3/2010 | Trainor et al. |
| 2010/0231386 A1 | 9/2010 | Barnes |
| 2010/0253090 A1 | 10/2010 | Kuelbs et al. |
| 2010/0271199 A1 | 10/2010 | Belov et al. |
| 2010/0303005 A1 | 12/2010 | Gossain et al. |
| 2011/0080044 A1 | 4/2011 | Schmiegel |
| 2011/0127958 A1 | 6/2011 | Ishishita et al. |
| 2011/0156634 A1 | 6/2011 | Lai |
| 2011/0234148 A1 | 9/2011 | Wen |
| 2011/0291483 A1 | 12/2011 | Yamane et al. |
| 2011/0295575 A1 | 12/2011 | Levine et al. |
| 2011/0308574 A1 | 12/2011 | Vaidyanathan |
| 2012/0007441 A1 | 1/2012 | John |
| 2012/0020060 A1 | 1/2012 | Myer et al. |
| 2012/0026764 A1 | 2/2012 | Giuntini et al. |
| 2012/0143383 A1 | 6/2012 | Cooperrider et al. |
| 2012/0147780 A1 | 6/2012 | Gossain et al. |
| 2012/0155475 A1 | 6/2012 | Vasseur et al. |
| 2012/0166848 A1 | 6/2012 | Broad et al. |
| 2012/0191252 A1 | 7/2012 | Rockenfeller et al. |
| 2012/0192025 A1 | 7/2012 | Veillette |
| 2012/0200235 A1 | 8/2012 | Shuy et al. |
| 2012/0230696 A1 | 9/2012 | Pederson et al. |
| 2012/0260967 A1 | 10/2012 | Dwyer et al. |
| 2012/0290857 A1 | 11/2012 | Broad et al. |
| 2012/0327831 A1 | 12/2012 | Arendas |
| 2013/0000695 A1 | 1/2013 | Giri |
| 2013/0000696 A1 | 1/2013 | Giri |
| 2013/0002027 A1 | 1/2013 | Yu et al. |
| 2013/0063073 A1 | 3/2013 | Kawasaki et al. |
| 2013/0021002 A1 | 6/2013 | Mayes |
| 2013/0234645 A1 | 9/2013 | Goei et al. |
| 2013/0324059 A1 | 12/2013 | Lee et al. |
| 2014/0080406 A1 | 3/2014 | Freitas et al. |
| 2014/0129163 A1 | 5/2014 | Betzner |
| 2014/0216528 A1 | 8/2014 | Vaidyanathan |
| 2014/0297206 A1 | 12/2014 | Silverman |
| 2014/0368046 A1 | 12/2014 | MacWilliams et al. |
| 2015/0001945 A1 | 1/2015 | Estes |
| 2015/0016260 A1 | 1/2015 | Chow et al. |
| 2015/0021990 A1 | 1/2015 | Myer et al. |
| 2015/0086213 A1 | 3/2015 | Pederson et al. |
| 2015/0088253 A1 | 3/2015 | Doll et al. |
| 2015/0213709 A1 | 7/2015 | Miller et al. |
| 2015/0244306 A1 | 8/2015 | Estes |
| 2015/0260430 A1 | 9/2015 | Tamaura |
| 2015/0303710 A1 | 10/2015 | John |

(56) References Cited

U.S. PATENT DOCUMENTS

| | | |
|---|---|---|
| 2016/0094079 A1 | 3/2016 | Hiroki et al. |
| 2016/0109497 A1 | 4/2016 | Aiello et al. |
| 2016/0111918 A1 | 4/2016 | Benson |
| 2016/0141879 A1 | 5/2016 | Motsenbocker |
| 2016/0149805 A1 | 5/2016 | Hui et al. |
| 2016/0179994 A1 | 6/2016 | Levine et al. |
| 2016/0192126 A1 | 6/2016 | Dubey et al. |
| 2016/0198548 A1 | 7/2016 | Monaci et al. |
| 2016/0226305 A1 | 8/2016 | Estes |
| 2016/0226761 A1 | 8/2016 | Hui et al. |
| 2016/0286444 A1 | 9/2016 | Wang |
| 2016/0315506 A1 | 10/2016 | John |
| 2016/0320787 A1 | 11/2016 | Carlson |
| 2016/0322835 A1 | 11/2016 | Carlson et al. |
| 2016/0336623 A1 | 11/2016 | Nayar et al. |
| 2016/0344476 A1 | 11/2016 | Pederson et al. |
| 2017/0025983 A1 | 1/2017 | Sills et al. |
| 2017/0064599 A1 | 3/2017 | Caine et al. |
| 2017/0079124 A1 | 3/2017 | Flinsenberg et al. |
| 2017/0168098 A1 | 6/2017 | Aiello et al. |
| 2017/0222923 A1 | 8/2017 | Hui et al. |
| 2017/0302218 A1 | 10/2017 | Janik |
| 2018/0001985 A1 | 1/2018 | Zhang et al. |
| 2018/0063037 A1 | 3/2018 | Edwards |
| 2018/0097467 A1 | 4/2018 | Sills et al. |
| 2018/0109458 A1 | 4/2018 | Chow et al. |
| 2018/0115185 A1 | 4/2018 | John |
| 2018/0128438 A1 | 5/2018 | Sreshta et al. |
| 2018/0184907 A1* | 7/2018 | Tran .................. A61B 5/1116 |
| 2018/0202224 A1 | 7/2018 | Kumar |
| 2018/0226697 A1 | 8/2018 | Edwards |
| 2018/0227849 A1 | 8/2018 | Edwards |
| 2018/0268689 A1 | 9/2018 | Lewis |
| 2018/0269685 A1 | 9/2018 | Sugeno et al. |
| 2018/0302853 A1* | 10/2018 | Chandra .................. H04L 43/10 |
| 2019/0019632 A1 | 1/2019 | Rusling et al. |
| 2019/0027951 A1 | 1/2019 | Park et al. |
| 2019/0061885 A1 | 2/2019 | Baro et al. |
| 2019/0098725 A1 | 3/2019 | Sadwick et al. |
| 2019/0133303 A1 | 5/2019 | Thiel et al. |
| 2019/0137631 A1 | 5/2019 | Rayudu et al. |
| 2019/0159412 A1 | 5/2019 | Guidish et al. |
| 2019/0171221 A1 | 6/2019 | Minorics |
| 2019/0181678 A1 | 6/2019 | Jiang et al. |
| 2019/0230589 A1 | 7/2019 | Chandra et al. |
| 2019/0257686 A1 | 8/2019 | Popat |
| 2019/0259892 A1 | 8/2019 | Moslehl |
| 2019/0326501 A1 | 10/2019 | Gilbert et al. |
| 2019/0364492 A1 | 11/2019 | Azizi et al. |
| 2019/0367191 A1 | 12/2019 | Wasson et al. |
| 2019/0394654 A1 | 12/2019 | Gardner |
| 2020/0099336 A1 | 3/2020 | Monforte et al. |
| 2020/0112087 A1 | 4/2020 | Kulkarni et al. |
| 2020/0116320 A1 | 4/2020 | Sreshta et al. |
| 2020/0120513 A1 | 4/2020 | Cahillo-O'Brien et al. |
| 2020/0120575 A1 | 4/2020 | Cahillo-O'Brien et al. |
| 2020/0125157 A1* | 4/2020 | Kachare .............. G06F 13/1668 |
| 2020/0169219 A1 | 5/2020 | Zhang et al. |
| 2020/0205062 A1 | 6/2020 | Azizi et al. |
| 2020/0213929 A1 | 7/2020 | Edwards et al. |
| 2020/0213930 A1 | 7/2020 | Edwards et al. |

FOREIGN PATENT DOCUMENTS

| | | |
|---|---|---|
| KR | 10-2018-0020717 A | 2/2018 |
| WO | 2012/064906 A2 | 5/2012 |
| WO | 2017/199229 A1 | 11/2017 |

OTHER PUBLICATIONS

Non-Final Office Action received for U.S. Appl. No. 16/237,554 dated Aug. 5, 2020, 36 pages.
Final Office Action received for U.S. Appl. No. 16/237,554 dated Jan. 13, 2021, 29 pages.
International Search Report for application No. PCT/US2019/068082 dated Mar. 11, 2020.
Non-Final Office Action received for U.S. Appl. No. 16/237,558 dated Aug. 6, 2020, 21 pages.
Final Office Action received for U.S. Appl. No. 16/237,558 dated Nov. 20, 2020, 21 pages.
International Search Report for application No. PCT/US2019/068032 dated Mar. 3, 2020.
Non-Final Office Action received for U.S. Appl. No. 16/237,554 dated Jul. 7, 2021, 27 pages.

* cited by examiner

SOLAR-POWERED ACCESS POINT FOR LOAD BALANCING NETWORK TRAFFIC ACROSS BACKHAUL NETWORKS

BACKGROUND

Field of the Various Embodiments

Embodiments of the present invention relate generally to wireless networks and, more specifically, to a solar-powered access point for load balancing network traffic across backhaul networks.

Description of the Related Art

A conventional utility distribution infrastructure typically includes multiple consumers, such as households and businesses, coupled to a set of intermediate distribution entities. The set of intermediate distribution entities draws resources from upstream providers and distributes those resources to the downstream consumers. In a modern utility distribution infrastructure, the consumers as well as the intermediate distribution entities may include various network devices, such as smart utility meters, that are networked together to form a wireless network. The network devices monitor the distribution of resources via the utility distribution infrastructure in real time to generate metrology data. Each network device reports metrology data to a utility provider that owns and/or operates the utility distribution infrastructure via one or more access points coupled to the wireless network.

Conventional access points are typically coupled to numerous network devices included in the utility distribution infrastructure and provide each of those network devices with network access. In this regard, a given access point typically routes network traffic received from a given network device across a wide area network (WAN) backhaul to the utility provider and/or to a control center that manages the operation of the wireless network. The given access point also routes network traffic received across the WAN backhaul to the given network device. In operation, one access point oftentimes routes network traffic for hundreds or thousands of different network devices.

One drawback of the above approach is that, because numerous network devices usually depend on a single access point for network access, that access point oftentimes is not able to route network traffic expeditiously. In some cases, a given access point can become so overloaded with network traffic that latencies of up to several hours can occur. Such large latencies can limit the effectiveness with which the associated remotely-located network devices can communicate.

Another drawback of the above approach is that conventional access points lose power during power outages, causing any network devices that are coupled to the access point to lose network connectivity. Some access points include a backup battery that allows continued operation for a short "holdup" period when power is lost. However, this holdup period is generally around eight hours, which is insufficient for many utility providers.

Yet another drawback of the above approach is that, when a conventional access point loses power, the access point also loses network configuration information associated with the network devices coupled to the access point. Consequently, when power is resorted, the access point and the network devices coupled to the access point must repeat a discovery process in order to re-establish communications with one another. The discovery process can take several hours to complete, during which time the network devices cannot report metrology data.

As the foregoing illustrates, what is needed in the art are more effective ways to provide connectivity to network devices within a wireless network.

SUMMARY

Some embodiments include a system, comprising a power subsystem that includes a secondary power cell that stores a first portion of power that is consumed during a first time interval when performing network communications with one or more nodes included in a wireless network, and a solar panel that, when exposed to a first level of irradiance during a second time interval, generates the first portion of power for storage in the secondary power cell, wherein the first time interval comprises an interval of continuous darkness and the second time interval comprises an interval of continuous daylight. The system further comprises a network subsystem that determines a first operational status associated with at least one of the power subsystem and the network subsystem, determines a second operational status associated with a first set of backhaul networks, generates a first set of routing metrics corresponding to the first set of backhaul networks based on the first operational status and the second operational status, and performs one or more operations to load balance network traffic received from a leaf node included in the wireless network across the first set of backhaul networks based on the first set of routing metrics.

One technological advantage of the disclosed design and approach relative to the prior art is that the SPD access point can effectively load balance network traffic across the two different backhaul networks, which allows the SPD access point to maintain low network latencies.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

Figure 1:
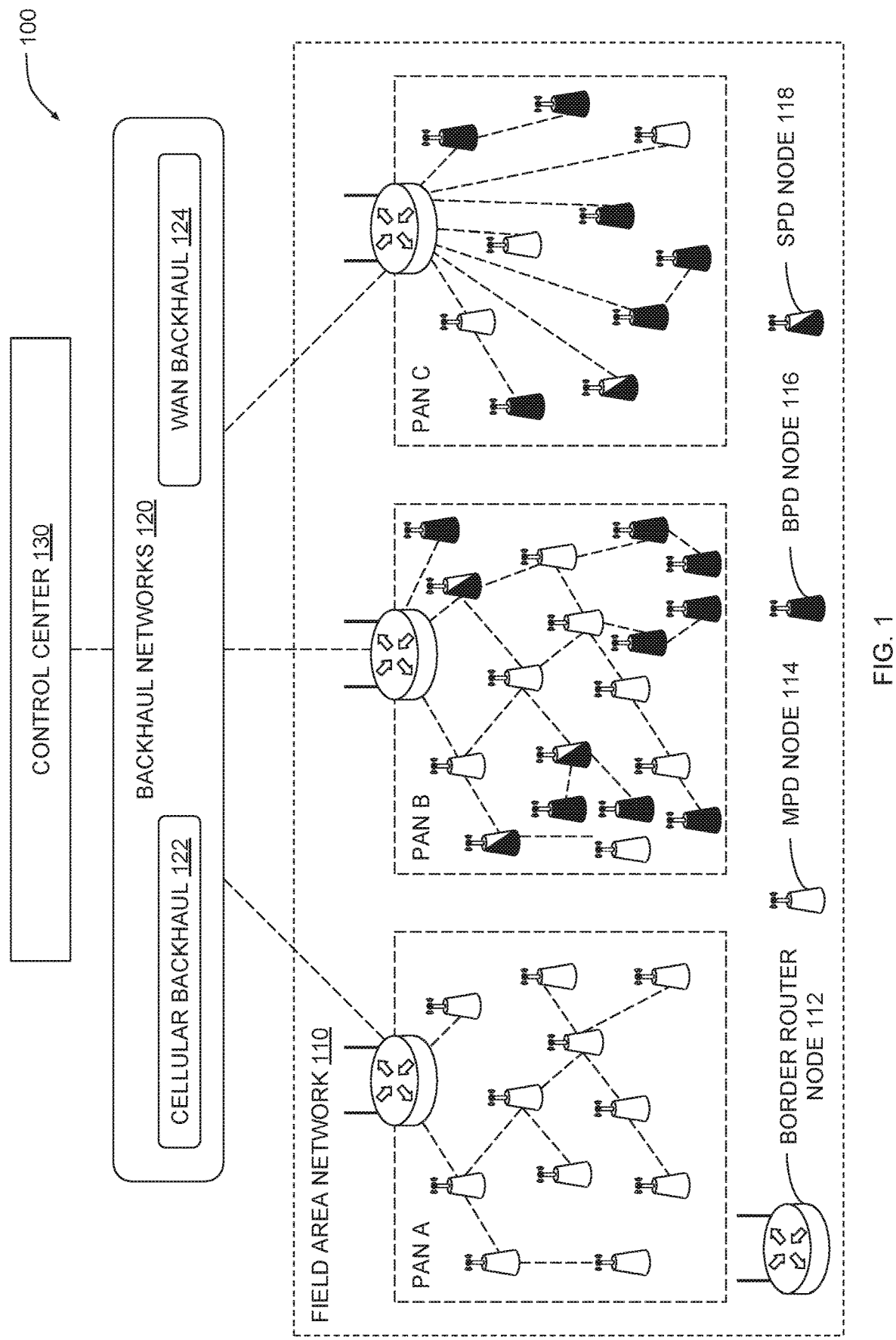
FIG. 1 illustrates a network system configured to implement one or more aspects of the present embodiments.

In the following description, numerous specific details are set forth to provide a more thorough understanding of the various embodiments. However, it will be apparent to one of skilled in the art that the inventive concepts may be practiced without one or more of these specific details.

As noted above, a modern utility distribution infrastructure often includes network devices that are configured to monitor and coordinate the distribution of resources at various locations. Each network device monitors resource distribution at a different location to generate metrology data, and then periodically reports the metrology data to a utility provider across a wireless network. One or more access points can be coupled to the wireless network to facilitate communications between the network devices and the utility provider and/or a control center that manages the operations of the wireless network. Conventional access points suffer from several deficiencies.

In particular, a conventional access point is usually coupled to numerous network devices and is therefore responsible for handling a large volume of network traffic. Consequently, the conventional access point usually cannot route network traffic with low latency. Additionally, a conventional access point typically depends on mains power to operate and therefore powers down during power outages. Some types of access points include backup batteries, but these backup batteries usually only provide an eight-hour "holdup" period during which network operations continue. Many utility providers need a longer holdup period, and therefore cannot use conventional access points. Finally, during power outages a conventional access point loses adjacency information associated with network devices and usually has to undergo a lengthy discovery process in order to re-establish communications with those network devices. During this time, the network devices lack network access and cannot report metrology data.

To address these issues, embodiments of the invention include a solar-powered device (SPD) node that is configured to operate as an access point. The SPD access point is powered by a solar hybrid battery system and does not depend on mains power. The solar hybrid battery system includes a solar panel, a primary cell, and a secondary cell. The secondary cell includes enough power storage to be capable of powering the SPD access point during the longest interval of darkness in the region where the SPD access point is deployed (also known as the winter solstice). The solar panel is sized relative to the secondary cell to be capable of fully recharging the secondary cell during the shortest daily interval of daylight in the region where the SPD access point is deployed, even under conditions of limited solar irradiance (e.g. due to cloud cover). The primary cell can charge the secondary cell if the SPD access point is shelved or malfunctioning to prevent the secondary cell from becoming overly depleted.

The SPD access point includes a wireless transceiver that allows the SPD access point to communicate with the control center via a WAN backhaul. The SPD access point also includes a cellular transceiver that allows the SPD access point to communicate with the control center via a cellular backhaul. One or more "leaf" nodes transmit network traffic to the SPD access point, and the SPD access point routes the network traffic to the utility provider and/or the control center via either of the two backhaul networks.

The SPD access point determines a specific backhaul network across which to route the network traffic based on several different factors associated with the SPD access point. Those factors include a current battery level, a current solar generation rate, and a current communication link status. The SPD access point also determines the specific backhaul network across which to route the network traffic based on characteristics of the different backhaul networks, including a network latency, among other characteristics. The SPD access point generates a routing metric for each backhaul network and then routes traffic across a specific backhaul network based on the associated routing metric and based on a priority level associated with the network traffic.

One technological advantage of the disclosed design and approach relative to the prior art is that the SPD access point can effectively load balance network traffic across the two different backhaul networks, which allows the SPD access point to keep network latency low. Another technological advantage of the disclosed approach is that the SPD access point continues to operate normally during power outages because the SPD access point does not rely on mains power. Accordingly, the SPD access point can meet the holdup period requirements set forth by many utility providers. Another technological advantage of the disclosed approach is that SPD access points retain network configuration information during power outages and can distribute this information to leaf nodes when power is restored. Accordingly, those leaf nodes can rapidly re-form a mesh network without having to repeat the lengthy discovery process. These technological advantages represent multiple technological advancements relative to prior art approaches.

System Overview

FIG. 1 illustrates a network system configured to implement one or more aspects of the present embodiments. As shown, network system 100 includes a field area network (FAN) 110, backhaul networks 120, and a control center 130. FAN 110 is coupled to control center 130 via backhaul networks 120. Backhaul networks 120 include a cellular backhaul 122 that supports Internet protocol (IP) routing as well as a wide-area network (WAN) backhaul 124 that similarly support IP routing. Control center 130 is configured to coordinate the operation of FAN 110 via communications across cellular backhaul 122 and WAN backhaul 124.

FAN 110 includes personal area network (PANs) A, B, and C. PANs A and B are organized according to a mesh network topology, while PAN C is organized according to a star network topology. Each of PANs A, B, and C includes at least one border router node 112 and one or more mains-powered device (MPD) nodes 114. PANs B and C further include one or more battery-powered device (BPD) nodes 116 and one or more solar-powered device (SPD) nodes 118.

MPD nodes 114 draw power from an external power source, such as mains electricity or a power grid. MPD nodes 114 typically operate on a continuous basis without powering down for extended periods of time. BPD nodes 116 draw power from an internal power source, such as a battery. BPD nodes 116 typically operate intermittently and power down for extended periods of time in order to conserve battery power. SPD nodes 118 include solar panels that generate power from sunlight. SPD nodes 118 store generated power in secondary cells and draw power from those secondary cells to support node operations.

MPD nodes 114, BPD nodes 116, and SPD nodes 118 are coupled to, or included within, a utility distribution infrastructure (not shown) that distributes a resource to consumers. MPD nodes 114, BPD nodes 116, and SPD nodes 118 gather sensor data related to the distribution of the resource, process the sensor data, and communicate processing results and other information to control center 130. Border router nodes 112 operate as access points to provide MPD nodes 114, BPD nodes 116, and SPD nodes 118 with access to control center 130.

Any of border router nodes 112, MPD nodes 114, BPD nodes 116, and SPD nodes 118 are configured to communicate directly with one or more adjacent nodes via bi-directional communication links. The communication links may be wired or wireless links, although in practice, adjacent nodes of a given PAN exchange data with one another by transmitting data packets via wireless radio frequency (RF) communications. The various node types are configured to perform a technique known in the art as "channel hopping" in order to periodically receive data packets on varying channels. As known in the art, a "channel" may correspond to a particular range of frequencies. In one embodiment, a node may compute a current receive channel by evaluating a Jenkins hash function based on a total number of channels and the media access control (MAC) address of the node.

Each node within a given PAN may implement a discovery protocol to identify one or more adjacent nodes or "neighbors." A node that has identified an adjacent, neighboring node may establish a bi-directional communication link with the neighboring node. Each neighboring node may update a respective neighbor table to include information concerning the other node, including the MAC address of the other node as well as a received signal strength indication (RSSI) of the communication link established with that node.

Nodes may compute the channel hopping sequences of adjacent nodes to facilitate the successful transmission of data packets to those nodes. In embodiments where nodes implement the Jenkins hash function, a node computes a current receive channel of an adjacent node using the total number of channels, the MAC address of the adjacent node, and a time slot number assigned to a current time slot of the adjacent node.

Any of the nodes discussed above may operate as a source node, an intermediate node, or a destination node for the transmission of data packets. A given source node may generate a data packet and then transmit the data packet to a destination node via any number of intermediate nodes (in mesh network topologies). The data packet may indicate a destination for the packet and/or a particular sequence of intermediate nodes to traverse in order to reach the destination node. In one embodiment, each intermediate node may include a forwarding database indicating various network routes and cost metrics associated with each route.

In addition, any of the nodes discussed above can be configured to operate as access points for other nodes included in FAN 110. For example, one or more MPD nodes 114 and one or more SPD nodes 118 could be configured as access points for different or overlapping portions of FAN 110. Further, those MPD node(s) 114 and SPD node(s) 118 could be configured to coordinate load balancing of network traffic across different backhaul networks 120. FIGS. 5-8 illustrate several examples of how an MPD node 114 and an SPD node 118 interoperate to load balance network traffic across cellular backhaul 122 and WAN backhaul 124.

Nodes may transmit data packets across a given PAN and across one or more backhaul networks 120 to control center 130. Similarly, control center 130 may transmit data packets across one or more backhaul networks 120 and across any given PAN to a particular node included therein. As a general matter, numerous routes may exist which traverse any of PANs A, B, and C and include any number of intermediate nodes, thereby allowing any given node or other component within network system 100 to communicate with any other node or component included therein.

Control center 130 includes one or more server machines (not shown) configured to operate as sources for, or destinations of, data packets that traverse within network system 100. The server machines may query nodes within network system 100 to obtain various data, including raw or processed sensor data, power consumption data, node/network throughput data, status information, and so forth. The server machines may also transmit commands and/or program instructions to any node within network system 100 to cause those nodes to perform various operations. In one embodiment, each server machine is a computing device configured to execute, via a processor, a software application stored in a memory to perform various network management operations.

Figure 2:
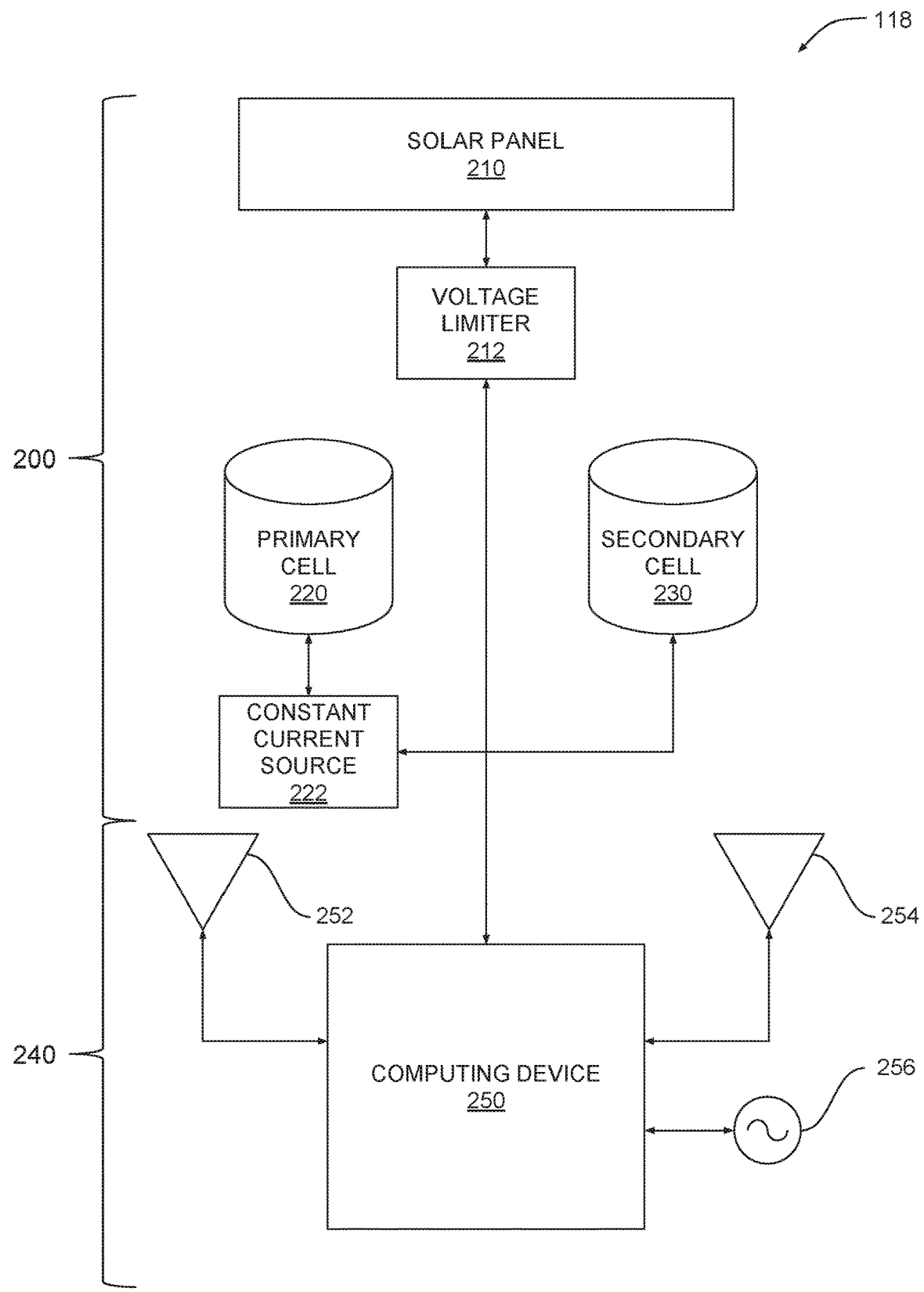
FIG. 2 is a more detailed illustration of one of the solar-powered device (SPD) nodes of FIG. 1, according to various embodiments.

Nodes may likewise include computing device hardware configured to perform processing operations and execute program code. Each node may further include various analog-to-digital and digital-to-analog converters, digital signal processors (DSPs), harmonic oscillators, transceivers, and any other components generally associated with RF-based communication hardware. FIG. 2 illustrates a power subsystem and a network subsystem that may be included in any of the SPD nodes 118 of network system 100.

Solar-Powered Device Node Design

FIG. 2 is a more detailed illustration of one of the solar-powered device (SPD) nodes of FIG. 1, according to various embodiments. As shown, an SPD node 118 includes a power subsystem 200 and a network subsystem 240. Power subsystem 200 includes a solar panel 210, a voltage limiter 212, a primary cell 220, a constant current source 222, and a secondary cell 230, coupled together. Primary cell 220 may be a Lithium Thionyl Chloride battery and secondary cell 230 may be an extended lifetime Lithium Ion battery, such as those manufactured by Tadiran, LTD.

Network subsystem 240 includes a computing device 250, one or more wireless transceivers 252, one or more cellular transceivers 254, and one or more oscillators 256. A given wireless transceiver 252 supports packet-based RF communications between nodes. A given cellular transceiver 254 support IP-based communications with a cellular tower (not shown). In one embodiment, cellular transceiver 254 may adhere to the narrow-band Internet-of-Things (NB-IoT) protocol. In another embodiment, network subsystem 240 may include a wired connection to the Internet. Some or all of the SPD nodes 118 shown in FIG. 1 may include instances of power subsystem 200 and network subsystem 240.

Solar panel 210 is coupled to voltage limiter 212. Primary cell 220 is coupled to constant current source 222. Secondary cell 230 is coupled to voltage limiter 212 and constant current source 222. Computing device 250 is coupled to solar panel 210 via voltage limiter 212, to primary cell 220 via constant current source 222, and to secondary cell 230. Computing device 250 is also coupled to wireless transceiver 252, cellular transceiver 254, and to oscillator 256.

In operation, computing device 250, wireless transceiver 252, cellular transceiver 254, and oscillator 256 draw power from secondary cell 230 to support the operation of an SPD node 118. These elements can also draw power from primary cell 220 to support the operation of the SPD node 118, although primary cell 220 may be omitted in some embodiments. Node operations include gathering metrology data from a utility line where the SPD node 118 is coupled, receiving data packets from other nodes, analyzing and/or processing data, transmitting data packets to other nodes, monitoring power generation of solar panel 210, and reporting status information to control center 130. Computing device 250 receives and/or transmits network traffic via wireless transceiver 252, cellular transceiver 254, and one or more wired connections based on timing signals generated by oscillator 256. In so doing, computing device 250 can load balance network traffic across cellular backhaul 122 and WAN backhaul 124 in a manner that maintains low network latency. Computing device 250 generally operates on a continuous basis and does not power down to conserve power during normal operations. Computing device 250 includes a processor that executes a software application to perform any of the node-oriented operations discussed herein, as also described in greater detail below in conjunction with FIG. 3.

During the day, solar panel 210 charges secondary cell 230. In particular, solar panel 210 converts sunlight into power and then stores this power in secondary cell 230. Voltage limiter 212 limits the voltage of that power to avoid damaging secondary cell 220. During the night, solar panel 210 does not charge secondary cell 230 and various node operations cause secondary cell 230 to deplete. Voltage limiter 212 prevents backflow of power from secondary cell 230 to solar panel 210 when solar panel 210 is unable to generate power, thereby preventing leakage of secondary cell 230 as well as damage to solar panel 210.

The storage capacity of secondary cell 230 and the power generation rate of solar panel 210 are determined to meet two specific design criteria. First, the storage capacity of secondary cell 230 is just sufficient to power the SPD node 118 during the longest night of the year in the geographical location where the node is deployed. For example, secondary cell 230 could have a storage capacity that is 10% greater than the minimum storage capacity needed to power the SPD node 118 during the longest night of the year in the geographical location where the node is deployed. This approach can compensate for capacity fade associated with secondary cell 230. As referred to herein, the term "night" refers to a continuous interval of darkness associated with one or more solar days.

Second, the power generation rate of solar panel 200 is sufficient to both power the SPD node 118 and fully recharge secondary cell 230 during a day with lower than normal solar irradiance and/or the shortest day of the year in the geographical location where the node is deployed. For example, solar panel 210 could have a power generation rate that is sufficient to both power the SPD node 118 and fully recharge secondary cell 230 during a very cloudy and/or very short day. As referred to herein, the term "day" refers to a continuous interval of daylight associated with one or more solar days. A day with lower than normal solar irradiance may have an amount of solar irradiance that is 15% or less than the average amount of daytime solar irradiance in the region where the SPD node 118 is deployed.

Importantly, configuring secondary cell 230 and solar panel 210 based on the two design criteria described above allows a very small and inexpensive secondary cell 230 with a very long operational lifetime to be used. In some configurations, secondary cell 230 can have an operational lifetime of over 20 years. Accordingly, the disclosed techniques are well-suited for implementation in a variety of different battery-powered devices, beyond those associated with networks. For example, power subsystem 200 could be included in a Fast Pass device, a shipping container data logger, a G-shock and/or Global Positioning System (GPS) location logger, a parking occupancy sensor, a motion and/or presence detector, a thermostat, a light controller, a remote terminal unit, and so forth.

For various reasons, a given SPD node 118 that includes power subsystem 200 is inexpensive compared to a conventional network device that needs to be coupled to mains power. In particular, because power subsystem 200 need not be coupled to mains power, power subsystem 200 is relatively simple and the given SPD node 118 can thus be manufactured at little cost. Further, because power subsystem 200 generates power from sunlight, a technician does not need to tie the given SPD node 118 into mains power, reducing installation overhead. Additionally, because the given SPD node 118 need not be tied into mains power, the given SPD node 118 does not have to be deployed on a utility pole, thereby eliminating pole lease fees.

Because SPD nodes 118 are very inexpensive and do not have to be coupled to mains power, SPD nodes 118 can be widely distributed across the geographical area where FAN 110 resides. Accordingly, SPD nodes 118 are especially well-suited for deployment as access points in remote locations with limited network access. In some instances, one or more leaf nodes may reside in such locations and access FAN 110 via an SPD node 118 that is configured to operate as an access point. SPD nodes 118 configured as access points confer several advantages compared to MPD nodes 114 configured as access points.

In particular, an SPD node 118 configured as an access point can route network traffic with low latency because the SPD node 118 load balances the network traffic across cellular backhaul 122 and WAN backhaul 124. Additionally, the SPD node 118 is not coupled to mains power and therefore does not lose power during power outages. Accordingly, the SPD node 118 can persistently provide network access to leaf nodes. The SPD node 118 also maintains network configuration information for leaf nodes that is not lost during power outages, allowing those leaf nodes to rapidly re-mesh with one another without having to repeat the discovery process.

Solar-Powered Device Node Hardware

Figure 3:
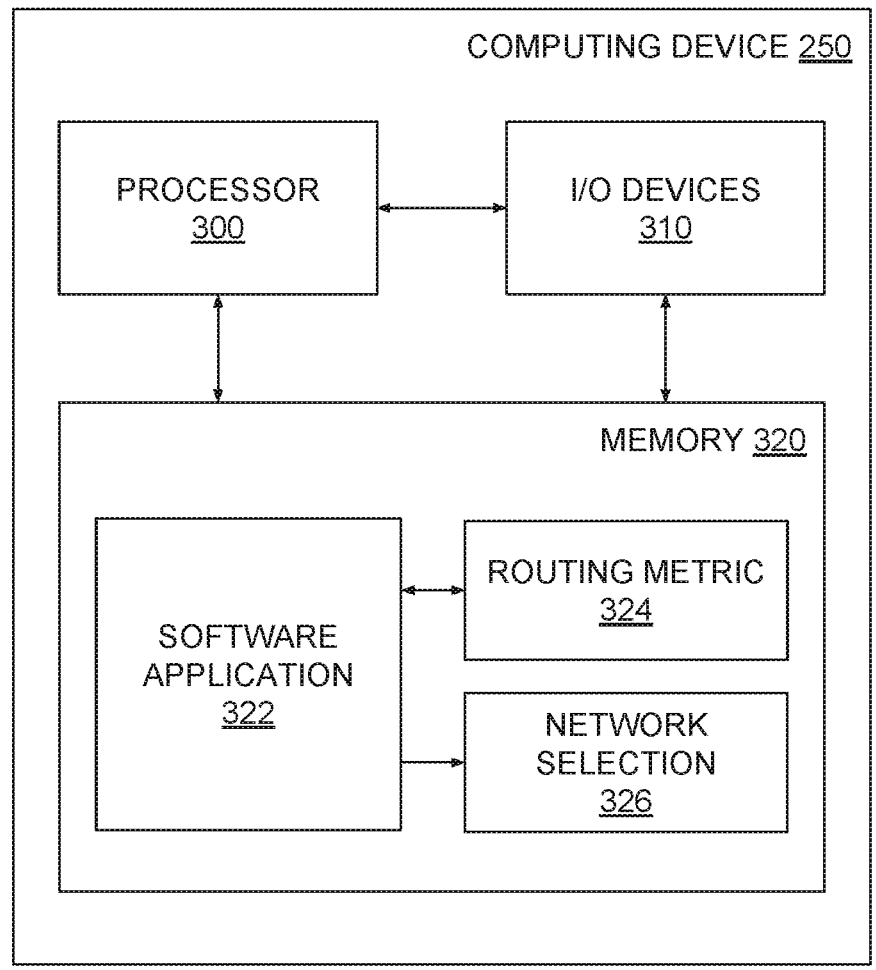
FIG. 3 is a more detailed illustration of the computing device of FIG. 2, according to various embodiments.

FIG. 3 is a more detailed illustration of the computing device of FIG. 2, according to various embodiments. As shown, computing device 240 includes a processor 300, input/output (I/O) devices 310, and memory 320, coupled together. Processor 300 may include any hardware configured to process data and execute software applications. Processor 300 may include real-time clock (RTC) (not shown) according to which processor 300 maintains an estimate of the current time. I/O devices 310 include devices configured to receive input, devices configured to provide output, and devices configured to both receive input and provide output. Memory 320 may be implemented by any technically feasible storage medium. Memory 320 includes a software application 322, a routing metric 324, and a network selection 326. Software application 322 includes program code that, when executed by processor 300, performs any of the node-oriented computing functionality described herein.

In operation, software application 322 configures the SPD node 118 of FIG. 3 to operate as an access point in order to provide one or more leaf nodes with network access. Software application 322 establishes communications with one or more leaf nodes via the discovery process described above in conjunction with FIG. 1. Software application 322 also establishes communications with one or more MPD nodes 114 that reside adjacent to the SPD node 118 via the discovery process. The adjacent MPD nodes 114 are coupled to WAN backhaul 124 and provide access to control center 130 via WAN backhaul 124. The SPD node 118 can also access control center 130 via cellular backhaul 122.

Once the SPD node 118 establishes communications in the manner described above, software application 322 analyzes various paths that traverse the different backhaul networks to generate routing metrics 324. Each routing metric 324 generally reflects the suitability of a specific backhaul network for transporting network traffic. For example, one routing metric 324 could indicate the suitability of routing network traffic across cellular backhaul 122, while another routing metric 324 could indicate the suitability of routing network traffic across WAN backhaul 124 (via the adjacent MPD node 114). The SPD node 118 implements these different routing metrics to load balance network traffic across the different backhaul networks.

In particular, when software application 322 receives network traffic from the connected leaf nodes, software application 322 generates network selection 326 based on routing metrics 324 and based on a priority level associated with the network traffic. Network selection 326 indicates a specific backhaul network to use for transporting the network traffic to and/or from control center 130. Software application 322 then routes the network traffic according to network selection 326. Various engines included in software application 322 that perform the above-described operations are described in greater detail below in conjunction with FIG. 4.

Solar-Powered Device Node Software

Figure 4:
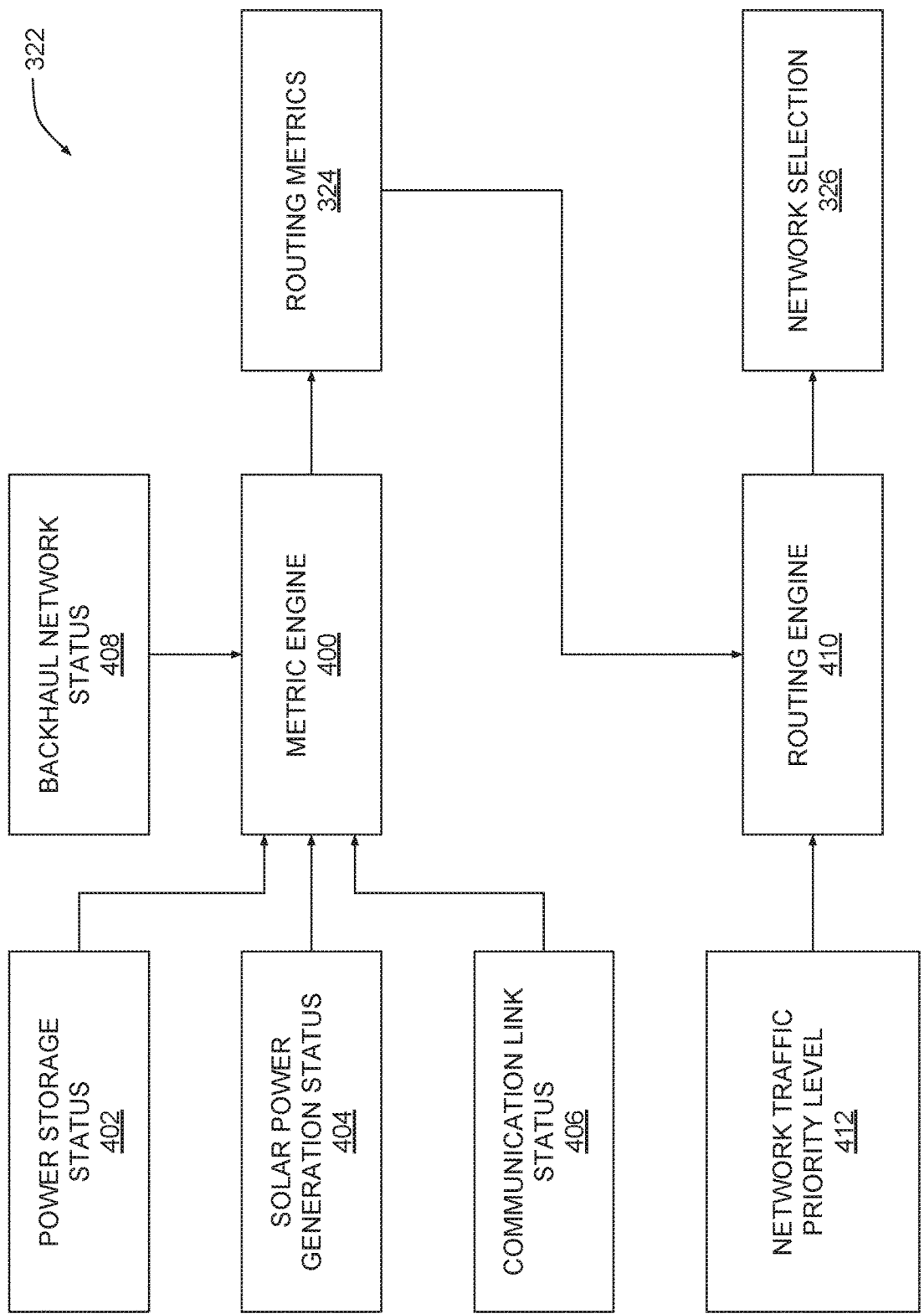
FIG. 4 is a more detailed illustration of the software application of FIG. 3, according to various embodiments.

FIG. 4 is a more detailed illustration of the software application of FIG. 3, according to various embodiments. As shown, software application 322 includes a metric engine 400 and a routing engine 410. Metric engine 400 generates routing metrics 324 based on power storage status 402, solar power generation status 404, and communication link status 406 associated with the SPD node 118 as well as backhaul network status 408 associated with cellular backhaul 122 and/or WAN backhaul 124.

Power storage status 402 reflects an amount of power stored by primary cell 220 and/or secondary cell 230 included in the SPD node 118. Solar power generation status 404 reflects a rate at SPD node 118 generates power via solar panel 210. Communication link status 406 reflects various characteristics of communications links between the SPD node 118 and the various backhaul networks. Those characteristics include one or more of a link quality, a link cost, a signal strength, a signal-to-noise ratio, and a packet loss rate. Backhaul network status 408 indicates the status of cellular backhaul 122 and/or WAN backhaul 124. For example, backhaul network status 408 could indicate a network latency associated with each backhaul network.

Metric engine 400 generates routing metrics 324 based on power storage status 402 and solar power generation status 404 because cellular transceiver 254 consumes more power when communicating via cellular backhaul 122 than is consumed when communicating across WAN backhaul 124. Accordingly, when power storage status 402 indicates a low battery level and/or solar power generation status 404 indicates a low solar power generation rate, WAN backhaul 124 may be a more suitable choice for routing network traffic. Similarly, when power storage status 402 indicates a high battery level and/or solar power generation status 404 indicates a high solar power generation rate, cellular backhaul 122 may be a more suitable choice for routing network traffic.

Metric engine 400 generates routing metrics 324 based on communication link status 406 because routing network traffic across some communication links may incur greater energy expenditure compared to other communication links. For example, routing network traffic via a communication link with a very high packet loss rate could consume an elevated amount of power if packets need to be re-transmitted multiple times. Metric engine 400 analyzes a communication link between the SPD node 118 and cellular backhaul 122 and/or a mesh link between the SPD node 118 and an adjacent MPD node 114 coupled to WAN backhaul 122 to determine communication link status 406.

Metric engine 400 generates routing metrics 324 based on backhaul network status 408 because the different backhaul networks generally route network traffic with different characteristics, including different latencies. For example, in some situations, cellular backhaul 122 could route network traffic with lower latency compared to WAN backhaul 124. In such situations, cellular backhaul 122 may be a more suitable choice for routing network traffic that needs to be routed quickly. In other situations, WAN backhaul 124 may be a more suitable choice for routing network traffic that does not need to be routed quickly.

Metric engine 400 may process the statuses described above in any technically feasible manner to generate routing metric 324. For example, metric engine 400 could normalize the various quantities associated with each status and then generate a weighted sum of those normalized quantities. In doing so, metric engine 400 could implement any technically feasible weighting. Routing metric 324 can be periodically re-generated to reflect changing node and/or network conditions.

Metric engine 400 generally performs the above operations once communication is established between the SPD node 118, various leaf nodes, and an MPD node 114 coupled to WAN backhaul 124. Subsequently, when the SPD node 118 receives network traffic from the leaf nodes, routing engine 410 analyzes the network traffic to determine network traffic priority level 412. For example, routing engine 410 could analyze a data packet included in the network traffic and extract a priority bit indicating whether the data packet is a high priority data packet or a low priority data packet. The network traffic could also have a range of priority values.

Based on network traffic priority level 412 and routing metrics 324, routing engine 410 generates network selection 326 indicating a specific backhaul network across which to route the network traffic. For example, routing engine 410 could generate network selection 326 to indicate that high-priority network traffic should be routed across the backhaul network with a higher routing metric, and low-priority network traffic should be routed across the backhaul network with a lower routing metric 324. As a general matter, routing engine 410 generates network selections 326 that minimize power expenditure by avoiding situations where network traffic needs to be re-transmitted. FIGS. 5-8 set forth various examples of how routing engine 410 generates network selections based on routing metrics and/or network traffic priority levels. FIG. 9 sets forth an example of how the SPD node 118 can rapidly reform a mesh network of leaf nodes following a power outage.

Dynamically Routing Network Traffic Across Backhaul Networks

Figure 5:
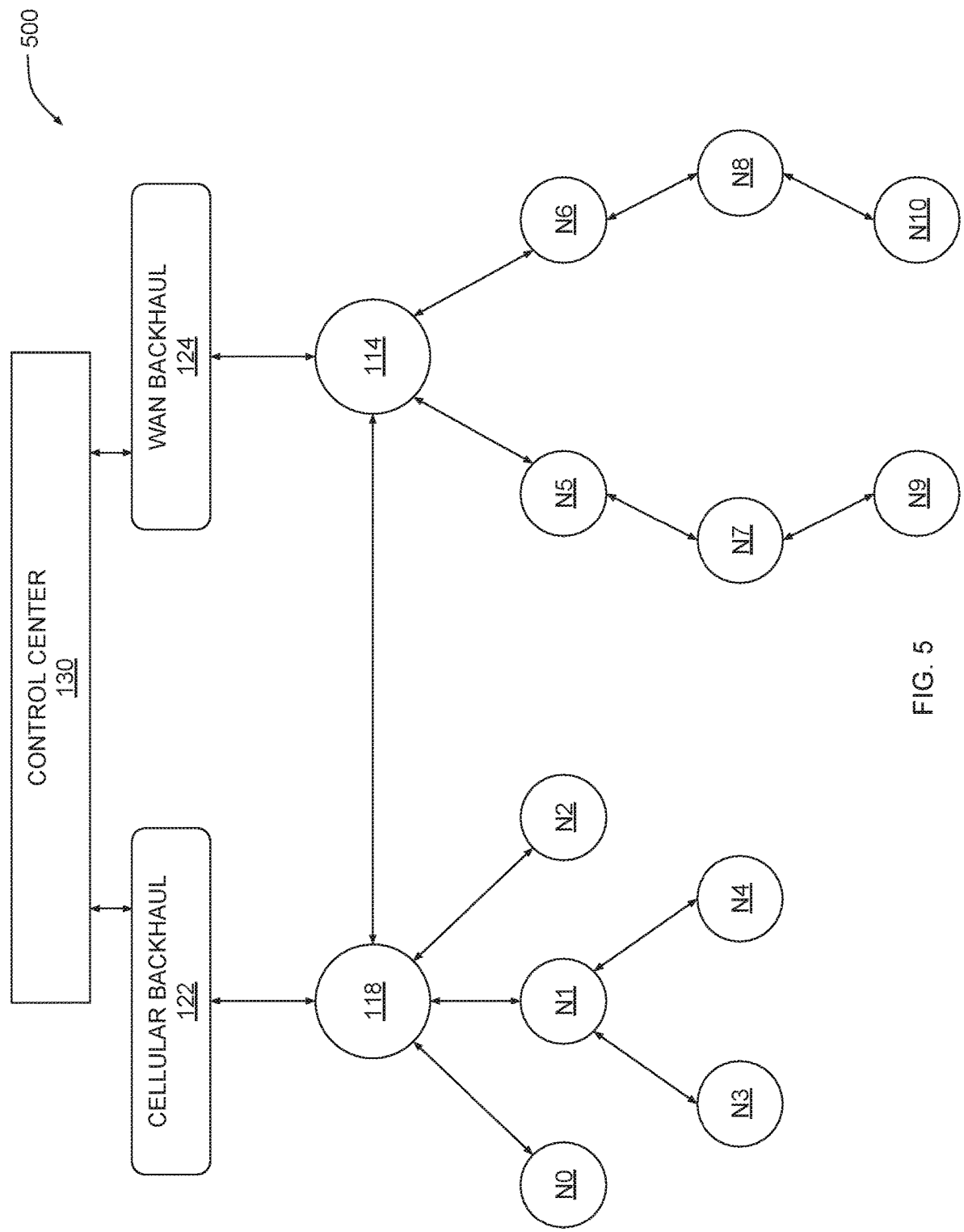
FIG. 5 illustrates a portion of the network system of FIG. 1 where a solar-powered device (SPD) node operates as an access point, according to various embodiments.

FIG. 5 illustrates a portion of the network system of FIG. 1 where a solar-powered device (SPD) node operates as an access point, according to various embodiments. As shown, portion 500 of network system 100 includes cellular backhaul 122 and WAN backhaul 124 coupled to control center 130. SPD node 118 is coupled to cellular backhaul 122. SPD node 118 is configured to operate as an access point for leaf nodes N0, N1, N2, N3, and N4. MPD node 114 is coupled to WAN backhaul 124. MPD node 114 is configured to operate as an access point for leaf nodes N5, N6, N7, N9, N9 and N10. Leaf nodes N0 through N10 can be any of the different types of nodes discussed thus far. SPD node 118 and MPD node 114 are coupled together and configured to interoperate with one another to load balance the routing of network traffic associated with leaf nodes N0 through N10. One example of how SPD node 118 routes network traffic is described in greater detail below in conjunction with FIG. 6.

Figure 6:
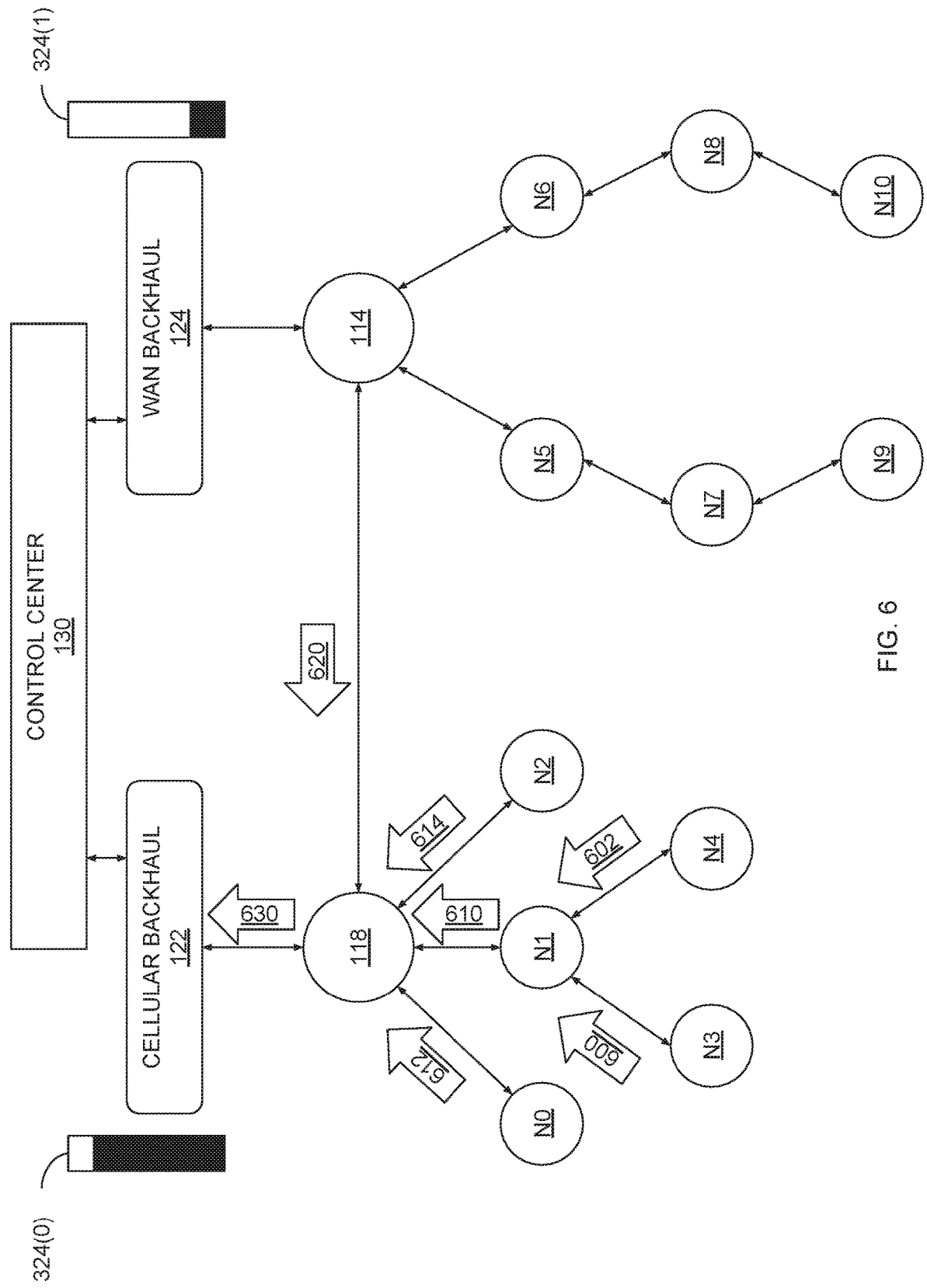
FIG. 6 illustrates how the SPD node of FIG. 5 routes network traffic across a cellular backhaul based on specific routing metrics, according to various embodiments.

FIG. 6 illustrates how the SPD node of FIG. 5 routes network traffic across a cellular backhaul based on specific routing metrics, according to various embodiments. As shown, cellular backhaul 122 is associated with routing metric 324(0) and WAN backhaul is associated with routing metric 324(1). SPD node 118 generates routing metrics 324(0) and 324(1) via the techniques described above in conjunction with FIG. 4. Each routing metric 324 quantifies the suitability of the corresponding backhaul network for transporting network traffic. Routing metric 324(0) is higher than routing metric 324(1), indicating that cellular backhaul 122 is currently more suitable for transporting network traffic than WAN backhaul 124.

As also shown, node N1 accumulates data packets 600 and 602 from nodes N3 and N4, respectively, and transmits data packet 610 to SPD node 118 based on those data packets. Nodes N0 and N2 transmit data packets 612 and 614 to SPD node 118, as well. MPD node 114 transmits data packet 620 to SPD node 118. Based on the received data packets, SPD node 118 generates and transmits data packet 630 across cellular backhaul 122 to control center 130. SPD node 118 selects cellular backhaul 122 to transport data packet 630 because routing metric 324(0) exceeds routing metric 324(1). In one embodiment, SPD node 118 advertises to MPD node 114 that SPD node 118 can route network traffic across cellular backhaul 122 on behalf of MPD node 114.

SPD node 118 dynamically updates routing metrics 324 for the different backhaul networks periodically and/or in response to changing network conditions. Under some circumstances, routing metrics 324 change sufficiently that SPD node 118 routes network traffic across a different backhaul network. For example, SPD node 118 could generate updated routing metrics 324 indicating that WAN backhaul 124 is more suitable for transporting network traffic than cellular network 122. This particular example is described in greater detail below in conjunction with FIG. 7.

Figure 7:
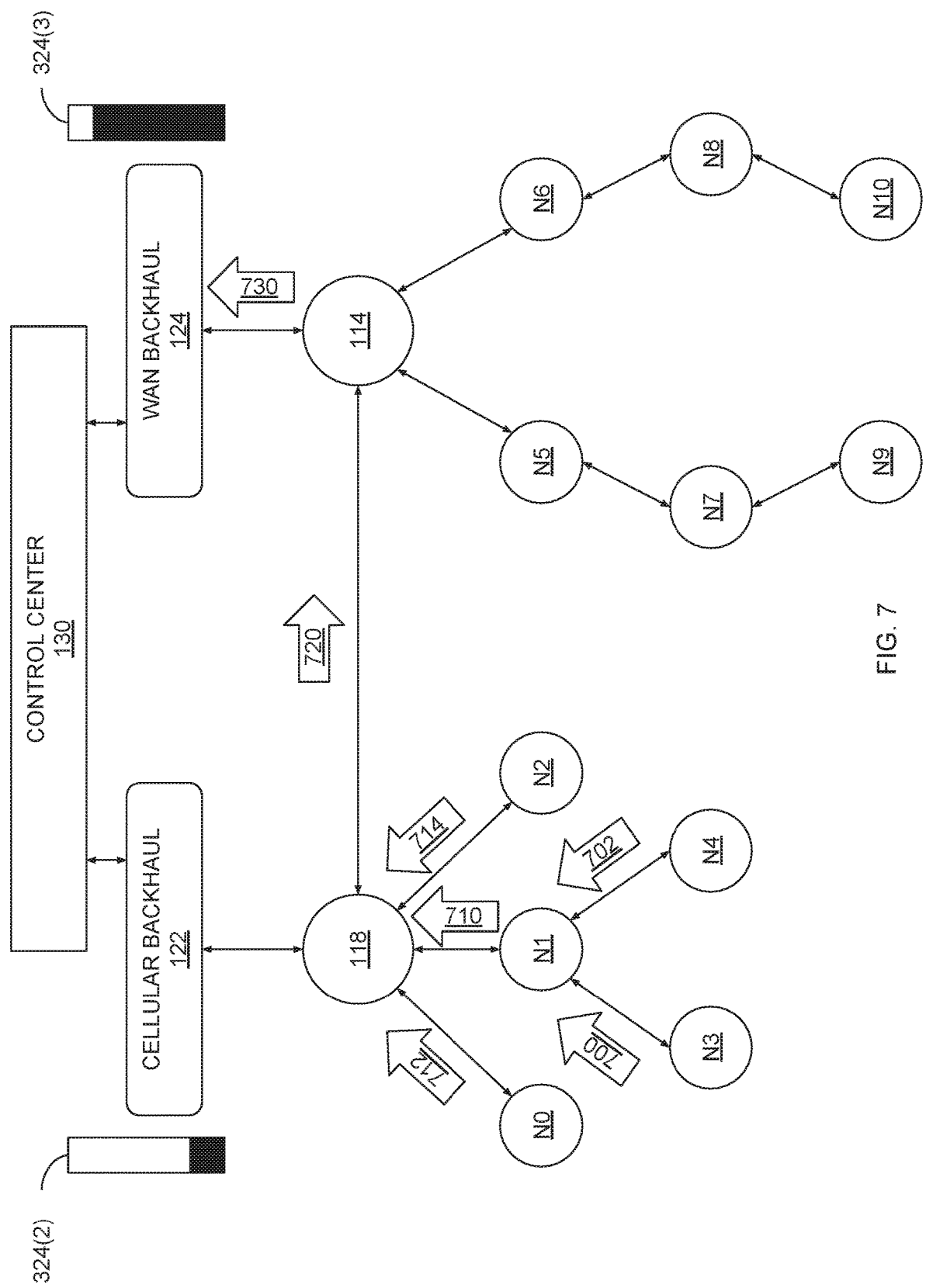
FIG. 7 illustrates how the SPD node of FIG. 5 routes network traffic across a WAN backhaul based on updated routing metrics, according to various embodiments.

FIG. 7 illustrates how the SPD node of FIG. 5 routes network traffic across a WAN backhaul based on updated routing metrics, according to various embodiments. As shown, cellular backhaul 122 is associated with routing metric 324(2) and WAN backhaul is associated with routing metric 324(3). SPD node 118 generates routing metrics 324(2) and 324(3) via the techniques described above in conjunction with FIG. 4 to quantify the suitability of the corresponding backhaul network for transporting network traffic. Routing metric 324(3) is higher than routing metric 324(2), indicating that WAN backhaul 124 is currently more suitable for transporting network traffic than cellular backhaul 122.

As also shown, node N1 accumulates data packets 700 and 702 from nodes N3 and N4, respectively, and transmits data packet 710 to SPD node 118 based on those data packets. Nodes N0 and N2 transmit data packets 712 and 714 to SPD node 118, as well. Based on the received data packets, SPD node 118 generates and transmits data packet 720 to MPD node 114. MPD node generates data packet 730 based on data packet 720 and any other data packets received from nodes N5 through N10, and then transmits data packet 730 across WAN backhaul 724 to control center 130. SPD node 118 transmits data packet 720 to MPD node 114 because routing metric 324(3) exceeds routing metric 324(4), indicating that WAN backhaul 124 is currently more suitable for transporting network traffic.

Under certain circumstances, SPD node 118 can load balance network traffic across cellular backhaul 122 and WAN backhaul 124 in proportion to different routing metrics. An example of how SPD node 118 load balances network traffic is described in greater detail below in conjunction with FIG. 8.

Figure 8:
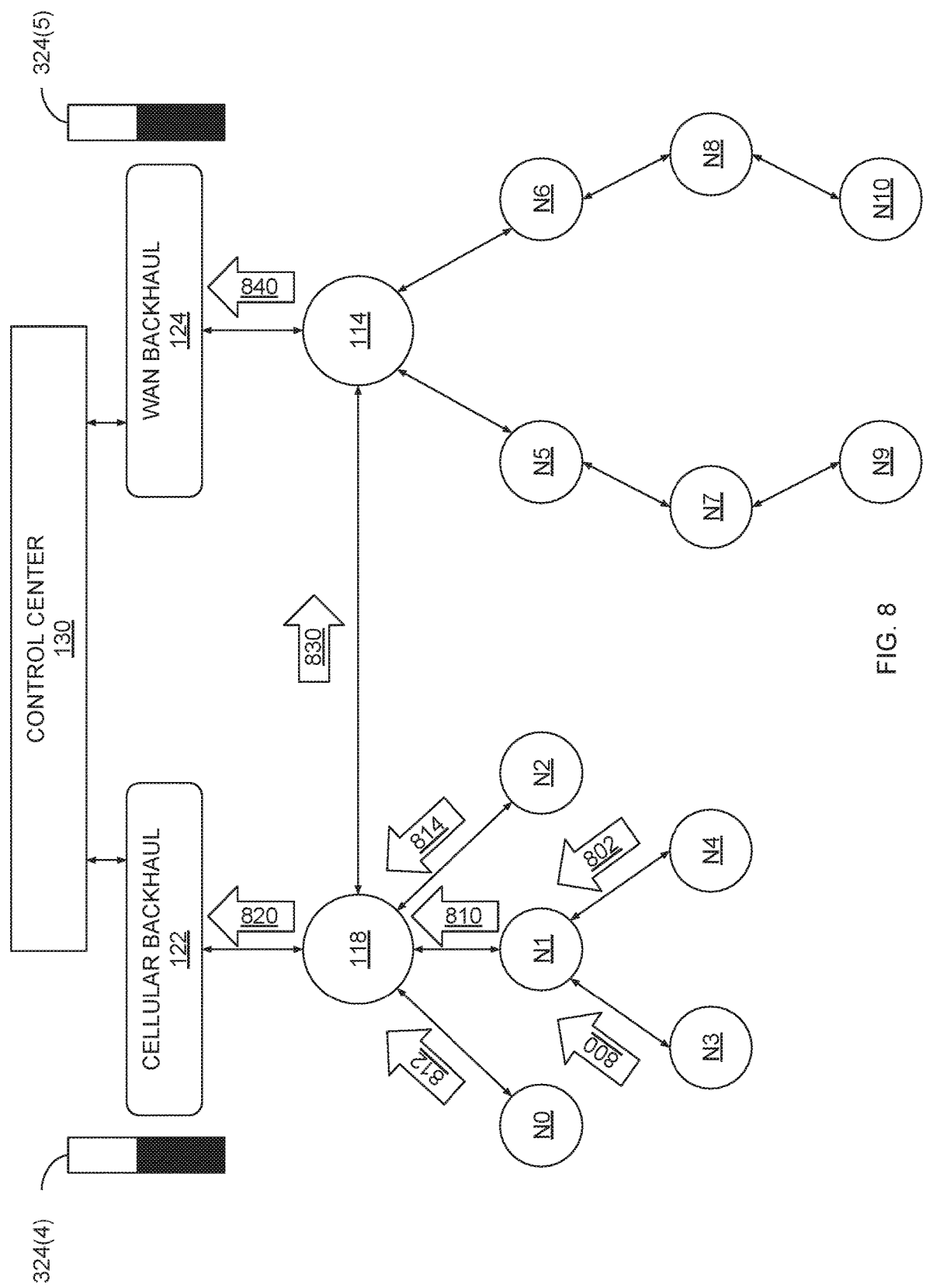
FIG. 8 illustrates how the SPD node of FIG. 5 load balances network traffic across different backhaul networks, according to various embodiments.
Figure 9:
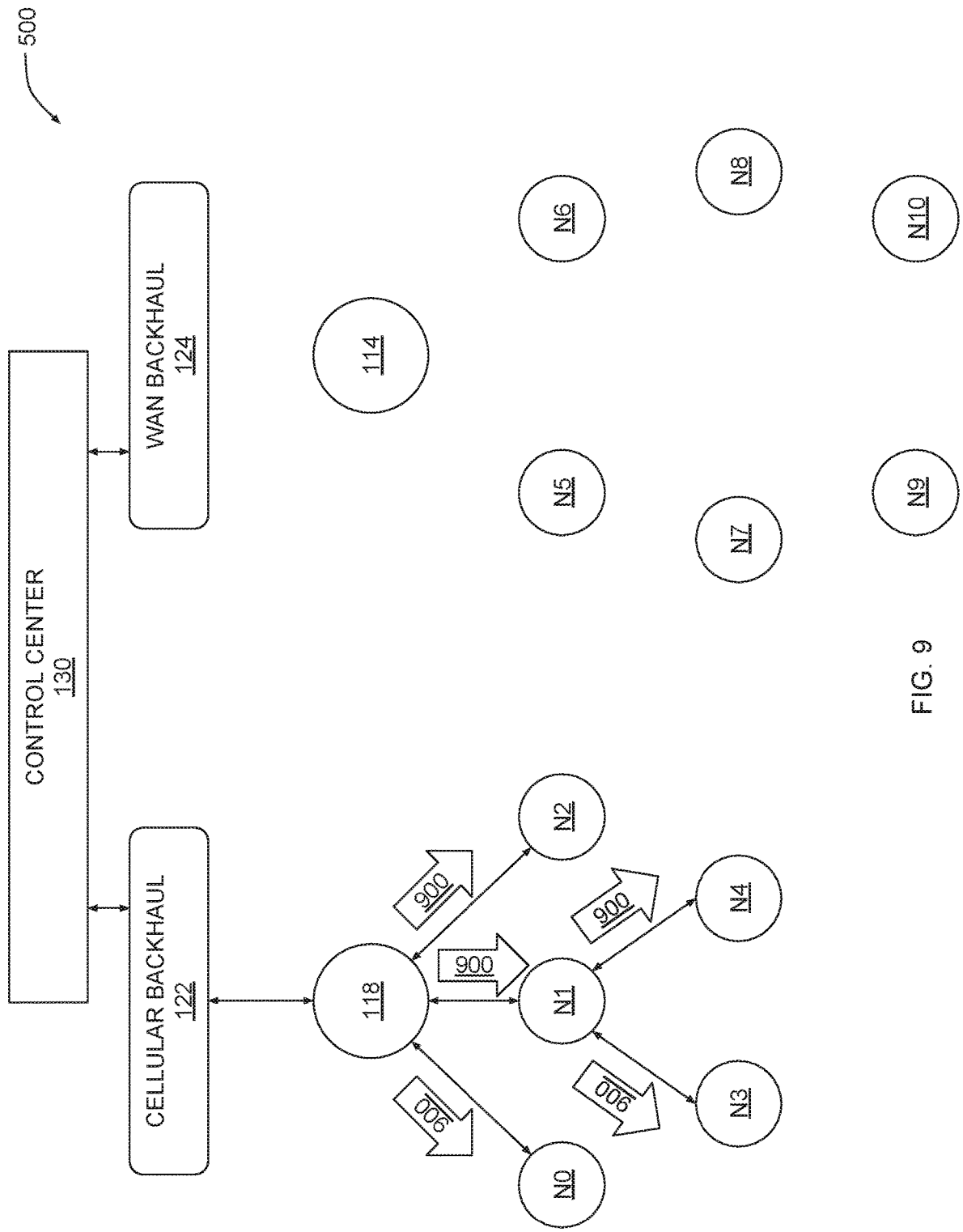
FIG. 9 illustrates how the SPD node of FIG. 5 re-establishes a mesh network following a power outage, according to various embodiments.

FIG. 8 illustrates how the SPD node of FIG. 5 load balances network traffic across different backhaul networks, according to various embodiments. As shown, cellular backhaul 122 is associated with routing metric 324(4) and WAN backhaul is associated with routing metric 324(5). SPD node 118 generates routing metrics 324(4) and 324(5) via the techniques described above in conjunction with FIG. 4.

As also shown, node N1 accumulates data packets 800 and 802 from nodes N3 and N4, respectively, and transmits data packet 810 to SPD node 118 based on those data packets. Nodes N0 and N2 transmit data packets 812 and 814 to SPD node 118, as well. Based on the received data packets, SPD node 118 generates and transmits data packet 820 across cellular backhaul 122 to control center. In addition, SPD node 118 generates and transmits data packet 830 to MPD node 114. MPD node generates data packet 840 based on data packet 830 and any other data packets received from nodes N5 through N10, and then transmits data packet 840 across WAN backhaul 124 to control center 130. In this manner, SPD node 118 transmits some network traffic across cellular backhaul 122 and other network traffic across WAN backhaul 124.

Referring generally to FIGS. 6-8, the SPD node 118 can implement any of the disclosed techniques to route network based on routing metrics 324 and additionally based on a priority level associated with the network traffic. For example, the SPD node 118 could route high-priority network traffic across the backhaul network with the higher routing metric 324 and route low-priority network traffic across the backhaul network with the lower routing metric 324. In addition, the SPD node 118 can route different amounts of network traffic to the different backhaul networks in proportion to the different routing metrics 324. In one embodiment, SPD node 118 may rely on MPD node 114 as a failover mechanism when the latency associated with cellular backhaul 122 exceeds a threshold value.

One advantage of the techniques described above is that SPD nodes 118 can be deployed as access points to provide leaf nodes with low-latency connections to control center 130. Another advantage is that SPD nodes 118 do not lose power during power outages and can therefore persistently provide network access to leaf nodes. In addition, SPD nodes 118 maintain network configuration information associated with leaf nodes and can therefore cause those leaf nodes to rapidly re-mesh with one another without repeating the discovery process. An example of how SPD node 118 causes leaf nodes to re-mesh is described in greater detail below in conjunction with FIG. 9.

FIG. 9 illustrates how the SPD node of FIG. 5 re-establishes a mesh network following a power outage, according to various embodiments. As shown, SPD node 118 disseminates network configuration information 900 to nodes N0 through N4. SPD node 118 initially procures network configuration information 900 after nodes N0 through N4 perform a discovery process and establish communications with one another. Network configuration information 900 includes adjacency information, node MAC addresses, timing information, and any other information needed to establish mesh network connections between nodes.

In one embodiment, SPD node 118 may receive network configuration information transmitted by leaf nodes in "last gasp" messages. Because SPD nodes 118 can be widely distributed in network system 100, SPD nodes 118 are more likely to be connected directly to leaf nodes and are therefore more likely to receive last gasp messages from leaf nodes. In other network configurations with higher hop counts, many last gasp message can be lost during power outages. The disclosed approach addresses this particular issue.

When a power outage occurs, nodes N0 through N4 may lose power and lose connectivity to one another and to SPD node 118. SPD node 118 continues to operate during power outages and maintains network configuration information 900. When nodes N0 through N4 power on, SPD node 118 distributes adjacency information 900, which allows nodes N0 through N4 to re-establish communications with one another quickly and without repeating the discovery process. Nodes N5 through N10, by contrast, cannot re-establish communications without performing the lengthy discovery process.

Load-Balancing Network Traffic Across Backhaul Networks

Figure 10:
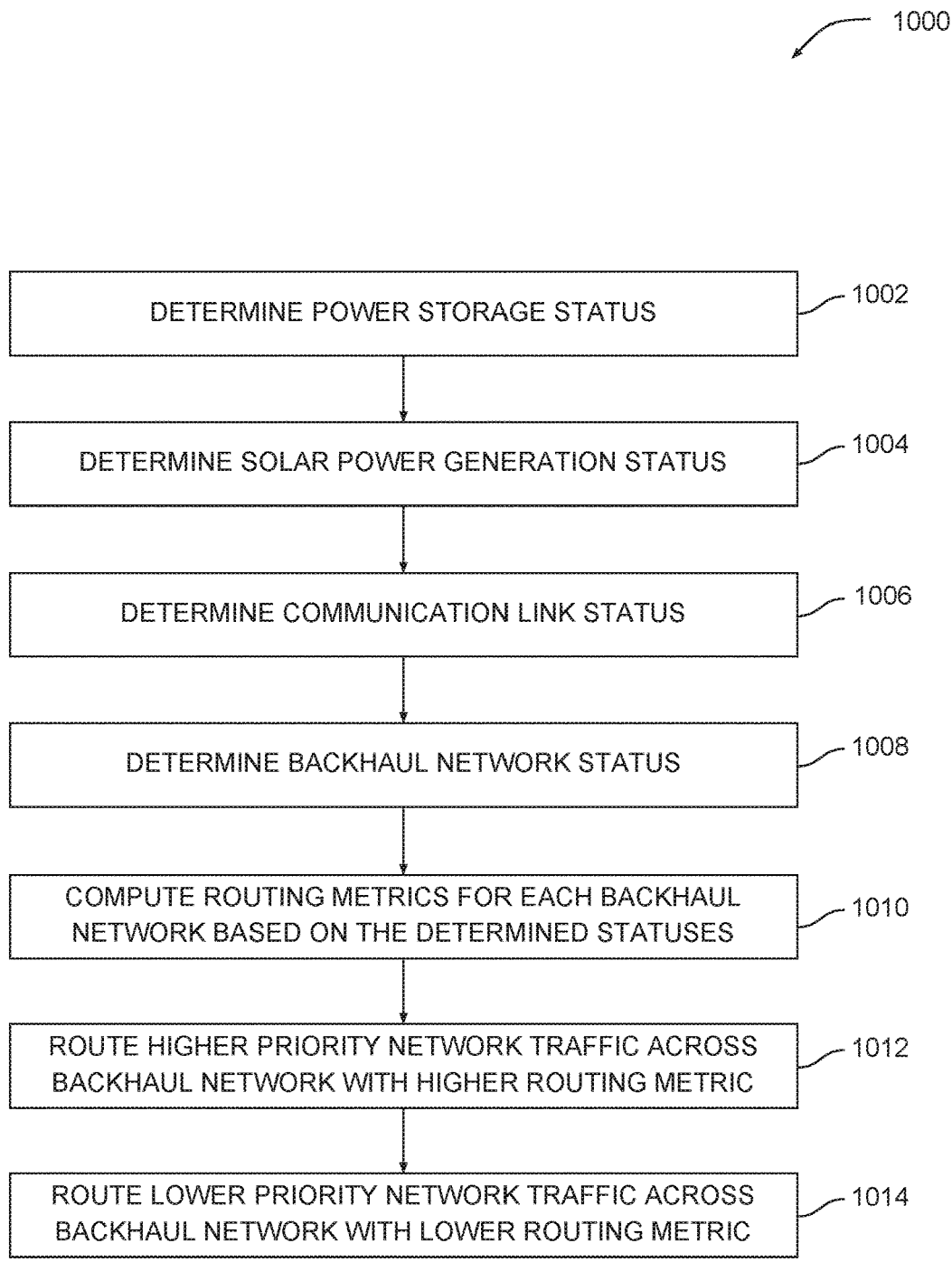
FIG. 10 is a flow diagram of method steps for load balancing network traffic between different backhaul networks, according to various embodiments.

FIG. 10 is a flow diagram of method steps for load balancing network traffic between different backhaul networks, according to various embodiments. Although the method steps are described in conjunction with the systems of FIGS. 1-9, persons skilled in the art will understand that any system configured to perform the method steps in any order falls within the scope of the present invention.

As shown, a method 1000 includes a sequence of steps that are performed to determine how an SPD node 118 that is configured to operate as an access point should route network traffic on behalf of one or more leaf nodes. The leaf nodes reside downstream of the SPD node 118. The SPD node 118 routes the network traffic across a cellular backhaul or across a WAN backhaul (via an adjacent MPD node 114). The various steps of the method 1000 are performed by the SPD node 118 after performing a discovery process to establish communications with the various leaf nodes and adjacent nodes.

At step 1002, the SPD node 118 determines a current power storage status. The power storage status reflects the amount of power stored by the SPD node 118 in primary cell 220 and/or secondary cell 230. When power storage status is low, power should be conserved and so the SPD node 118 can route network traffic in a manner that conserves power.

At step 1004, the SPD node 118 determines a current solar power generation status. The solar power generation status of the SPD node 118 indicates whether the SPD node 118 is currently generating power from sunlight. The solar power generation status can also reflect a rate at which the SPD node 118 generates power via solar panel 210. As with the power storage status discussed in conjunction with step 1002, when the solar power generation rate is low, power should be conserved and so the SPD node 118 can route network traffic in a manner that conserves power.

At step 1006, the SPD node 118 determines the communication link status of any communication links between the SPD node 118 and the different backhaul networks. The communication link status associated with a given communication link includes one or more of a link quality, a link cost, a signal strength, a signal-to-noise ratio, and a packet loss rate. Some communication links may incur greater power expenditure than others. For example, a communication link with a higher packet loss rate may incur greater power expenditure because dropped packets would need to be re-transmitted.

At step 1008, the SPD node 118 determines the status of cellular backhaul 122 and WAN backhaul 124. In particular, the SPD node 118 determines a current latency with which those backhaul networks transport network traffic. In some cases, cellular backhaul 122 transports network traffic with a low latency on the order of several minutes, while WAN backhaul 124 transports network traffic with a high latency on the order of several hours.

At step 1010, the SPD node 118 computes a routing metric for each backhaul network based on the statuses determined at steps 1002, 1004, 1006, and 1008. For example, a metric engine included in the SPD node 118 could normalize the various quantities associated with each status and then generate a weighted sum of those normalized quantities. An exemplary metric engine is depicted in FIG. 4. The routing metric associated with a given backhaul network quantifies the suitability of that backhaul network for transporting network traffic.

At step 1012, the SPD node 118 routes higher priority traffic across the backhaul network with the higher routing metric. For example, a routing engine included in the SPD node 118 could analyze network traffic received from the one or more leaf nodes and identify any data packets marked as high priority. The routing engine could then generate a network selection indicating that the high priority data packets should be routed across the backhaul network with the higher routing metric.

At step 1014, the SPD node 118 routes lower priority traffic across the backhaul network with the lower routing metric. For example, the routing engine mentioned above could analyze network traffic received from the one or more leaf nodes and identify any data packets marked as low priority. The routing engine could then generate a network selection indicating that the low priority data packets should be routed across the backhaul network with the lower routing metric.

Referring generally to FIGS. 1-10, SPD node 118 can be deployed in a variety of situations where conventional access points are not typically deployed or cannot be deployed. For example, one or more SPD nodes 118 could be deployed in an agricultural setting to manage the operation of a mesh network that includes different moisture sensors. The moisture sensors could be configured to monitor the hydration level of one or more crops. Conventional access points are typically not deployed in agricultural settings because mains power is not usually available.

In another example, one or more SPD nodes 118 could be deployed in a shipyard to manage the operation of a mesh network that includes leaf nodes configured to track the position of shipping containers. A given SPD node 118 could triangulate between signals received from multiple leaf nodes to pinpoint the location of a given shipping container. Conventional access points are not typically deployed in shipyards because mains power is not usually available at all of the locations where those access points would need to be deployed.

In another example, one or more SPD nodes 118 could be deployed on public transit to communicate with leaf nodes positioned on buses, trains, and so forth. The leaf nodes could report position information to a given SPD node 118, and the given SPD node 118 could then update a transit schedule. The given SPD node 118 could also be deployed on a bus, train, or other form of transportation. Conventional access points are not typically deployed in a mobile context because conventional access points are usually too large and therefore immobile.

In another example, one or more SPD nodes 118 could be deployed to form a temporary mesh network. The temporary mesh network could manage various leaf nodes that capture sensor data associated with a short-term project, such as a construction project. When the short-term project is complete, the temporary mesh network could be dismantled. Conventional access points are not typically deployed for temporary usage because deploying conventional access points is expensive and complicated.

In another example, one or more SPD nodes 118 could be deployed at a transformer station to monitor various electrical equipment. A given SPD node 118 could generate metrology data associated with the transformer station and report the data to control center 130. Conventional access points cannot easily be deployed to transformer stations because coupling to mains power at a transformer station can cause those access points to be vulnerable to the phenomenon known as ground potential rise.

In another example, one or more SPD nodes 118 could be deployed as a generic sensor hub to provide power to one or more sensors. Conventional access points cannot be effectively deployed to power sensors, because conventional access points lose power during power outages, causing any sensors coupled thereto to power down.

In sum, embodiments of the invention include a solar-powered device (SPD) node that is configured to operate as an access point. The SPD access point is powered by a solar hybrid battery system and does not depend on mains power. The solar hybrid battery system includes a solar panel, a primary cell, and a secondary cell. The secondary cell includes enough power storage to be capable of powering the SPD access point during the longest interval of darkness in the region where the SPD access point is deployed (also known as the winter solstice). The solar panel is sized relative to the secondary cell to be capable of fully recharging the secondary cell during the shortest daily interval of daylight in the region where the SPD access point is deployed, even under conditions of limited solar irradiance (e.g. due to cloud cover). The primary cell can charge the secondary cell if the SPD access point is shelved or malfunctioning to prevent the secondary cell from becoming overly depleted.

The SPD access point includes a wireless transceiver that allows the SPD access point to communicate with the control center via a WAN backhaul. The SPD access point also includes a cellular transceiver that allows the SPD access point to communicate with the control center via a cellular backhaul. One or more "leaf" nodes transmit network traffic to the SPD access point, and the SPD access point routes the network traffic to the utility provider and/or the control center via either of the two backhaul networks.

The SPD access point determines a specific backhaul network across which to route the network traffic based on several different factors associated with the SPD access point. Those factors include a current battery level, a current solar generation rate, and a current communication link status. The SPD access point also determines the specific backhaul network across which to route the network traffic based on characteristics of the different backhaul networks, including a network latency, among other characteristics. The SPD access point generates a routing metric for each backhaul network and then routes traffic across a specific backhaul network based on the associated routing metric and based on a priority level associated with the network traffic.

One technological advantage of the disclosed design and approach relative to the prior art is that the SPD access point can effectively load balance network traffic across the two different backhaul networks, which allows the SPD access point to maintain low network latencies. Another technological advantage of the disclosed design and approach is that the SPD access point continues to operate normally during power outages because the SPD access point does not rely on mains power. Accordingly, the SPD access point can meet the holdup period requirements set forth by many utility providers. Another technological advantage of the disclosed approach is that the SPD access point retains network configuration information during power outages and can distribute this information to leaf nodes when power is restored. Accordingly, those leaf nodes can rapidly re-form a mesh network without having to repeat a lengthy discovery process with one another and/or the SPD access point. These technological advantages represent one or more technological advancements relative to prior art approaches.

1. Some embodiments include a system, comprising a power subsystem that includes a secondary power cell that stores a first portion of power that is consumed during a first time interval when performing network communications with one or more nodes included in a wireless network, and a solar panel that, when exposed to a first level of irradiance during a second time interval, generates the first portion of power for storage in the secondary power cell, wherein the first time interval comprises an interval of continuous darkness and the second time interval comprises an interval of continuous daylight, and a network subsystem that determines a first operational status associated with at least one of the power subsystem and the network subsystem, determines a second operational status associated with a first set of backhaul networks, generates a first set of routing metrics corresponding to the first set of backhaul networks based on the first operational status and the second operational status, and performs one or more operations to load balance network traffic received from a leaf node included in the wireless network across the first set of backhaul networks based on the first set of routing metrics.

2. The system of clause 1, wherein the first operational status indicates a power storage status associated with the power subsystem.

3. The system of any of clauses 1-2, wherein the first operational status indicates a solar power generation status associated with the power subsystem.

4. The system of any of clauses 1-3, wherein the first operational status indicates a communication link status associated with the network subsystem.

5. The system of any of clauses 1-4, wherein the communication link status includes at least one of a communication link quality, a communication link cost, a communication link signal strength, a communication link signal-to-noise ratio, and a communication link packet loss rate.

6. The system of any of clauses 1-5, wherein the one or more operations to load balance the network comprise determining a first priority level associated with a first portion of the network traffic, determining a first routing metric included in the first set of routing metrics that corresponds to the first priority level, identifying a first backhaul network included in the first set of backhaul networks that corresponds to the first routing metric, and transmitting the first portion of the network traffic across the first backhaul network.

7. The system of any of clauses 1-6, wherein the one or more operations to load balance the network traffic comprise identifying a first portion of network traffic marked as high priority, transmitting the first portion of network traffic across a first backhaul network included in the first set of backhaul networks based on a first routing metric included in the first set of routing metrics, identifying a second portion of network traffic marked as low priority, and transmitting the second portion of network traffic across a second backhaul network included in the first set of backhaul networks based on a second routing metric included in the first set of routing metrics, wherein the first routing metric is greater than the second routing metric.

8. The system of any of clauses 1-7, wherein the network subsystem obtains adjacency information associated with one or more leaf nodes included in the wireless network, determines that the leaf node powered down in response to a power outage, determines that the leaf node powered up in response to power being restored, and transmits the adjacency information to the leaf node, wherein the leaf node bypasses a discovery process and establishes communications with one or more nodes included in the wireless network based on the adjacency information.

9. The system of any of clauses 1-8, wherein the network subsystem includes a cellular transceiver and the first set of backhaul networks includes a cellular backhaul.

10. The system of any of clauses 1-9, wherein the network subsystem includes a wireless transceiver and the first set of backhaul networks includes a wide-area network backhaul.

11. Some embodiments include a computer-implemented method for routing network traffic associated with a wireless network, the method comprising storing a first portion of power in a secondary power cell, wherein the first portion of power is consumed during a first time interval when performing network communications with one or more nodes included in the wireless network, generating the first portion of power in response to a first level of irradiance during a second time interval, wherein the first time interval comprises an interval of continuous darkness and the second time interval comprises an interval of continuous daylight, determining a first operational status associated with a first node that includes the secondary power cell, determining a second operational status associated with a first set of backhaul networks, generating a first set of routing metrics corresponding to the first set of backhaul networks based on the first operational status and the second operational status, and performing one or more operations to load balance network traffic received from a leaf node included in the wireless network across the first set of backhaul networks based on the first set of routing metrics.

12. The computer-implemented method of clause 10, wherein the first operational status indicates at least one of a power storage status associated with the secondary cell and a solar power generation status associated with a solar panel that generates the first portion of power.

13. The computer-implemented method of any of clauses 11-12, wherein the first operational status indicates a communication link status associated with a communication link coupled between the first node and the first set of backhaul networks.

14. The computer-implemented method of any of clauses 11-13, wherein the communication link status includes at least one of a communication link quality, a communication link cost, a communication link signal strength, a communication link signal-to-noise ratio, and a communication link packet loss rate associated with the communication link.

15. The computer-implemented method of any of clauses 11-14, wherein performing the one or more operations to load balance the network comprises determining a first priority level associated with a first portion of the network traffic, determining a first routing metric included in the first set of routing metrics that corresponds to the first priority level, identifying a first backhaul network included in the first set of backhaul networks that corresponds to the first routing metric, and transmitting the first portion of the network traffic across the first backhaul network.

16. The computer-implemented method of any of clauses 11-15, further comprising obtaining adjacency information associated with one or more leaf nodes included in the wireless network, determining that the leaf node powered down in response to a power outage, determining that the leaf node powered up in response to power being restored, and transmitting the adjacency information to the leaf node, wherein the leaf node bypasses a discovery process and establishes communications with one or more nodes included in the wireless network based on the adjacency information.

17. The computer-implemented method of any of clauses 11-16, wherein the first set of backhaul networks includes a cellular backhaul and a wide-area network backhaul.

18. The computer-implemented method of any of clauses 11-17, wherein the first time interval and the second time interval occur during the winter solstice at a first location.

19. The computer-implemented method of any of clauses 11-18, wherein the first level of irradiance is equal to about fifteen percent of an average level of solar irradiance at a first location.

20. The computer-implemented method of any of clauses 11-19, wherein the secondary power cell has an operational lifetime of at least 20 years.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A system, comprising:
    a power subsystem that includes:
        a secondary power cell that stores a first portion of power that is consumed during a first time interval when performing network communications with one or more nodes included in a wireless network, and
        a solar panel that, when exposed to a first level of irradiance during a second time interval, generates the first portion of power for storage in the secondary power cell, wherein the first time interval comprises an interval of continuous darkness and the second time interval comprises an interval of continuous daylight; and
    a network subsystem that:
        determines a first operational status associated with at least one of a power storage level of the power subsystem or a solar power generation status of the power subsystem,
        determines a second operational status associated with a first set of backhaul networks,
        generates a first set of routing metrics corresponding to the first set of backhaul networks based on the first operational status associated with the at least one of the power storage level of the power subsystem or the solar power generation status of the power subsystem and the second operational status, and
        performs one or more operations to load balance network traffic received from a leaf node included in the wireless network across the first set of backhaul networks based on the first set of routing metrics.

2. The system of claim 1, wherein the first operational status indicates a power storage level associated with the power subsystem.

3. The system of claim 1, wherein the first operational status indicates a solar power generation status associated with the power subsystem.

4. The system of claim 1, wherein the network subsystem further determines a third operational status associated with the network subsystem, and wherein the first set of routing metrics generated by the network subsystem is further based on the third operational status.

5. The system of claim 4, wherein the third operational status indicates a communication link status associated with the network subsystem.

6. The system of claim 5, wherein the communication link status includes at least one of a communication link quality, a communication link cost, a communication link signal strength, a communication link signal-to-noise ratio, and a communication link packet loss rate.

7. The system of claim 1, wherein the one or more operations to load balance the network comprise:
    determining a first priority level associated with a first portion of the network traffic;

determining a first routing metric included in the first set of routing metrics that corresponds to the first priority level;
identifying a first backhaul network included in the first set of backhaul networks that corresponds to the first routing metric; and
transmitting the first portion of the network traffic across the first backhaul network.

8. The system of claim 1, wherein the one or more operations to load balance the network traffic comprise:
identifying a first portion of network traffic marked as high priority;
transmitting the first portion of network traffic across a first backhaul network included in the first set of backhaul networks based on a first routing metric included in the first set of routing metrics;
identifying a second portion of network traffic marked as low priority; and
transmitting the second portion of network traffic across a second backhaul network included in the first set of backhaul networks based on a second routing metric included in the first set of routing metrics, wherein the first routing metric is greater than the second routing metric.

9. The system of claim 1, wherein the network subsystem:
obtains adjacency information associated with one or more leaf nodes included in the wireless network;
determines that the leaf node powered down in response to a power outage;
determines that the leaf node powered up in response to power being restored; and
transmits the adjacency information to the leaf node, wherein the leaf node bypasses a discovery process and establishes communications with one or more nodes included in the wireless network based on the adjacency information.

10. The system of claim 1, wherein the network subsystem includes a cellular transceiver and the first set of backhaul networks includes a cellular backhaul.

11. The system of claim 1, wherein the network subsystem includes a wireless transceiver and the first set of backhaul networks includes a wide-area network backhaul.

12. A computer-implemented method for routing network traffic associated with a wireless network, the method comprising:
storing a first portion of power in a secondary power cell, wherein the first portion of power is consumed during a first time interval when performing network communications with one or more nodes included in the wireless network;
generating the first portion of power in response to a first level of irradiance during a second time interval, wherein the first time interval comprises an interval of continuous darkness and the second time interval comprises an interval of continuous daylight;
determining a first operational status associated with at least one of a power storage level of a power subsystem of a first node that includes the secondary power cell or a solar power generation status of the power subsystem;
determining a second operational status associated with a first set of backhaul networks;
generating a first set of routing metrics corresponding to the first set of backhaul networks based on the first operational status associated with the at least one of the power storage level of the power subsystem or the solar power generation status of the power subsystem and the second operational status; and
performing one or more operations to load balance network traffic received from a leaf node included in the wireless network across the first set of backhaul networks based on the first set of routing metrics.

13. The computer-implemented method of claim 12, wherein the first operational status indicates at least one of a power storage level associated with the secondary power cell and a solar power generation status associated with a solar panel that generates the first portion of power.

14. The computer-implemented method of claim 12, further comprising determining a third operational status that indicates a communication link status associated with a communication link coupled between the first node and the first set of backhaul networks, wherein the first set of routing metrics is further based on the third operational status.

15. The computer-implemented method of claim 14, wherein the communication link status includes at least one of a communication link quality, a communication link cost, a communication link signal strength, a communication link signal-to-noise ratio, and a communication link packet loss rate associated with the communication link.

16. The computer-implemented method of claim 12, wherein performing the one or more operations to load balance the network comprises:
determining a first priority level associated with a first portion of the network traffic;
determining a first routing metric included in the first set of routing metrics that corresponds to the first priority level;
identifying a first backhaul network included in the first set of backhaul networks that corresponds to the first routing metric; and
transmitting the first portion of the network traffic across the first backhaul network.

17. The computer-implemented method of claim 12, further comprising:
obtaining adjacency information associated with one or more leaf nodes included in the wireless network;
determining that the leaf node powered down in response to a power outage;
determining that the leaf node powered up in response to power being restored; and
transmitting the adjacency information to the leaf node, wherein the leaf node bypasses a discovery process and establishes communications with one or more nodes included in the wireless network based on the adjacency information.

18. The computer-implemented method of claim 12, wherein the first set of backhaul networks includes a cellular backhaul and a wide-area network backhaul.

19. The computer-implemented method of claim 12, wherein the first time interval and the second time interval occur during the winter solstice at a first location.

20. The computer-implemented method of claim 12, wherein the first level of irradiance is equal to about fifteen percent of an average level of solar irradiance at a first location.

21. The computer-implemented method of claim 12, wherein the secondary power cell has an operational lifetime of at least 20 years.

* * * * *